United States Patent
Hunt et al.

(10) Patent No.: US 12,437,118 B2
(45) Date of Patent: Oct. 7, 2025

(54) PROVISIONING SECURE/ENCRYPTED VIRTUAL MACHINES IN A CLOUD INFRASTRUCTURE

(71) Applicant: International Business Machines Corporation, Armonk, NY (US)

(72) Inventors: Guerney D. H. Hunt, Yorktown Heights, NY (US); Dimitrios Pendarakis, Westport, CT (US); Kenneth Alan Goldman, Norwalk, CT (US); Elaine R. Palmer, Hanover, NH (US); Ramachandra Pai, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/130,269

(22) Filed: Dec. 22, 2020

(65) Prior Publication Data

US 2022/0198070 A1   Jun. 23, 2022

(51) Int. Cl.
| | |
|---|---|
| G06F 21/00 | (2013.01) |
| G06F 21/31 | (2013.01) |
| G06F 21/44 | (2013.01) |
| G06F 21/60 | (2013.01) |
| G06F 21/74 | (2013.01) |

(52) U.S. Cl.
CPC .............. G06F 21/74 (2013.01); G06F 21/31 (2013.01); G06F 21/44 (2013.01); G06F 21/602 (2013.01)

(58) Field of Classification Search
CPC ........ G06F 21/31; G06F 21/44; G06F 21/602; G06F 21/74
See application file for complete search history.

(56) References Cited

U.S. PATENT DOCUMENTS

| | | |
|---|---|---|
| 8,954,752 B2 | 2/2015 | Boivie et al. |
| 9,195,824 B2 | 11/2015 | Smith |
| 9,521,140 B2 | 12/2016 | Roth |
| 9,875,368 B1 * | 1/2018 | Willden ............... H04L 9/0825 |
| 10,176,095 B2 | 1/2019 | Ferguson |
| 10,516,533 B2 | 12/2019 | Mannan et al. |
| 10,601,590 B1 | 3/2020 | Chhabra |
| 10,715,339 B1 * | 7/2020 | Wei ........................ G06F 21/53 |
| 10,742,421 B1 | 8/2020 | Wentz |
| 11,363,012 B1 | 6/2022 | Chhabra |
| 2011/0145598 A1 | 6/2011 | Smith |

(Continued)

FOREIGN PATENT DOCUMENTS

CN    102420846 A    4/2012

OTHER PUBLICATIONS

Mel, et al. "The NIST Definition of Cloud Computing". Recommendations of the National Institute of Standards and Technology, Nov. 16, 2015.

(Continued)

*Primary Examiner* — Rodman Alexander Mahmoudi
(74) *Attorney, Agent, or Firm* — Stosch Sabo

(57) ABSTRACT

A method, system and apparatus for generating a computation such that it will execute in a target trusted execution environment (TEE), including selecting the target TEE, generating an authorization that is satisfied by a TEE, associating the authorization with the computation that executes in the TEE that is authorized, and generating the computation with the associated authorization.

10 Claims, 19 Drawing Sheets

(56) References Cited

U.S. PATENT DOCUMENTS

| | | | |
|---|---|---|---|
| 2015/0082399 A1* | 3/2015 | Wu ..................... | H04L 9/0891 |
| | | | 726/10 |
| 2015/0134965 A1 | 5/2015 | Morenius et al. | |
| 2015/0227744 A1 | 8/2015 | Horovitz | |
| 2016/0085692 A1* | 3/2016 | Kwok ................... | G06F 21/79 |
| | | | 713/193 |
| 2016/0142212 A1 | 5/2016 | Sarangdhar et al. | |
| 2016/0275461 A1 | 9/2016 | Sprague | |
| 2016/0335531 A1* | 11/2016 | Mullen ............... | G06Q 20/357 |
| 2016/0379212 A1 | 12/2016 | Bowman | |
| 2017/0104580 A1 | 4/2017 | Wooten et al. | |
| 2017/0127457 A1* | 5/2017 | Kwon ................. | H04L 63/101 |
| 2018/0288052 A1 | 10/2018 | Sambandam et al. | |
| 2018/0336342 A1 | 11/2018 | Narendra Trivedi et al. | |
| 2018/0373881 A1 | 12/2018 | Thom | |
| 2019/0087575 A1 | 3/2019 | Sahita et al. | |
| 2019/0243963 A1 | 8/2019 | Soriente et al. | |
| 2019/0363894 A1 | 11/2019 | Kumar Ujjwal | |
| 2019/0370467 A1 | 12/2019 | Li | |
| 2020/0021445 A1 | 1/2020 | Caceres | |
| 2020/0028693 A1 | 1/2020 | Wu | |
| 2020/0218792 A1 | 7/2020 | Kataria | |
| 2020/0257828 A1 | 8/2020 | Durham et al. | |
| 2021/0409206 A1 | 12/2021 | Cao | |
| 2022/0078186 A1 | 3/2022 | Gurel | |
| 2022/0114249 A1* | 4/2022 | Grancharov ............ | G06F 21/53 |
| 2022/0156390 A1 | 5/2022 | Karame | |

OTHER PUBLICATIONS

Patil, et al, "Mechanism for Securely Onboarding Virtual Network Functions or Containers Based on Multifactor Authentication", An IP.com Prior Art Database Technical Disclosure, IP.com No. IPCOM000253541D, Apr. 9, 2018.

Disclosed Anonymously, et al.,"Processing Infrastructure as Code Artifacts Insolated Computing Environments for Secure Cloud Provisioning and Management", IP.com No. IPCOM000259292D, Jul. 25, 2019.

Disclosed Anonymously, et al.,"System and Method to Secure Virtual Machines in a Cloud Deployment", IP.com No. IPCOM000250505D, Jul. 26, 2017.

Michael Bartock, et al., NIST Hardware-Enabled Security for Server: "Enabling a Layered Approach to Platform Security for Cloud and Edge Computing Use Cases", Apr. 28, 2020.

Ultimaco, "Hardware-Based Cryptographic Key Management in the Cloud", pp. 1-5.

Cheruvu, et al., "Demystifying Internet of Things Security", Successful Lot Device/Edge and Platform Security Deployment, 2020.

IEEE Transactions on Computers, vol. 70, 2020, Gu Jinyu et al, "Enclavisor; A Hardware-Software Co-Design for Enclaves on Untrusted Cloud", pp. 1598-1611 abstract, first paragraph of section 2, section 3.3, figures 4 and 5.

2014 Yeluri Raghu, "Trusted Virtual Machines: Ensuring the Integrity of Virtual Machines in the Cloud Requirements for Trusted Virtual Machines" URL: https://link.springer.com/content/pdf/10.1007/978-1-4302-6146-9_8.pdf the whole document.

IBM Developer, 2018, Guerney Hunt "Supporting protected computing on IBM Power Architecture", pp. 1-12 URL: https://developer.ibm.com/articles/1-support-protected-computing the whole document.

Great Britain Combined Search and Examination Report under Sections 17 and 18(3), dated Jul. 5, 2022, in GB Application No. GB2117420.6.

Kim et al. "A Flash-Aware Cluster Allocation Scheme for Legacy File Systems", Journal of Information Science and Engineering, Jul. 2009, pp. 1191-1220, vol. 25, Issue No. 4.

United Kingdom Patent Office, "Examination Report issued," May 29, 2024, 3 Pages, Application No. 2117420.6.

Great Britain Examination report under Section 18(3), dated May 24, 2023, in GB Application No. GB2117420.6.

Application No. GB2117420.6, Patents Act 1977: Examination Report under Section 18(3), mailed Dec. 5, 2023, 2 pgs.

Corbet, J., (2019) "SGX: when 20 patch versions aren't enough," https://lwn.net/Articles/786487/ <Retrieved Dec. 7, 2023>.

List of IBM Patents or Patent Applications Treated as Related (2023).

Notice of References, U.S. Appl. No. 17/130,238, mailed Jan. 26, 2024, 1 pg.

Application No. GB2117420.6, Reply to Examination Report, Jan. 24, 2024, 15 pgs.

Japan Patent Office, "Notice of Reasons for Refusal" Jun. 23, 2025, 10 PAges, JP Application No. 2021-204428.

Paladi et al., "Trusted Launch of Virtual Machine Instances in Public IaaS Environments", Lecture Notes in Computer Science, 2012, 15 pages, vol. 7839, doi: https://doi.org/10.1007/978-3-642-37682-5_22.

Zhao et al., "TEE-aided Write Protection Against Privileged Data Tampering", arXiv, May 26, 2019, 15 pages, doi: https://doi.org/10.14722/ndss.2019.23197.

* cited by examiner

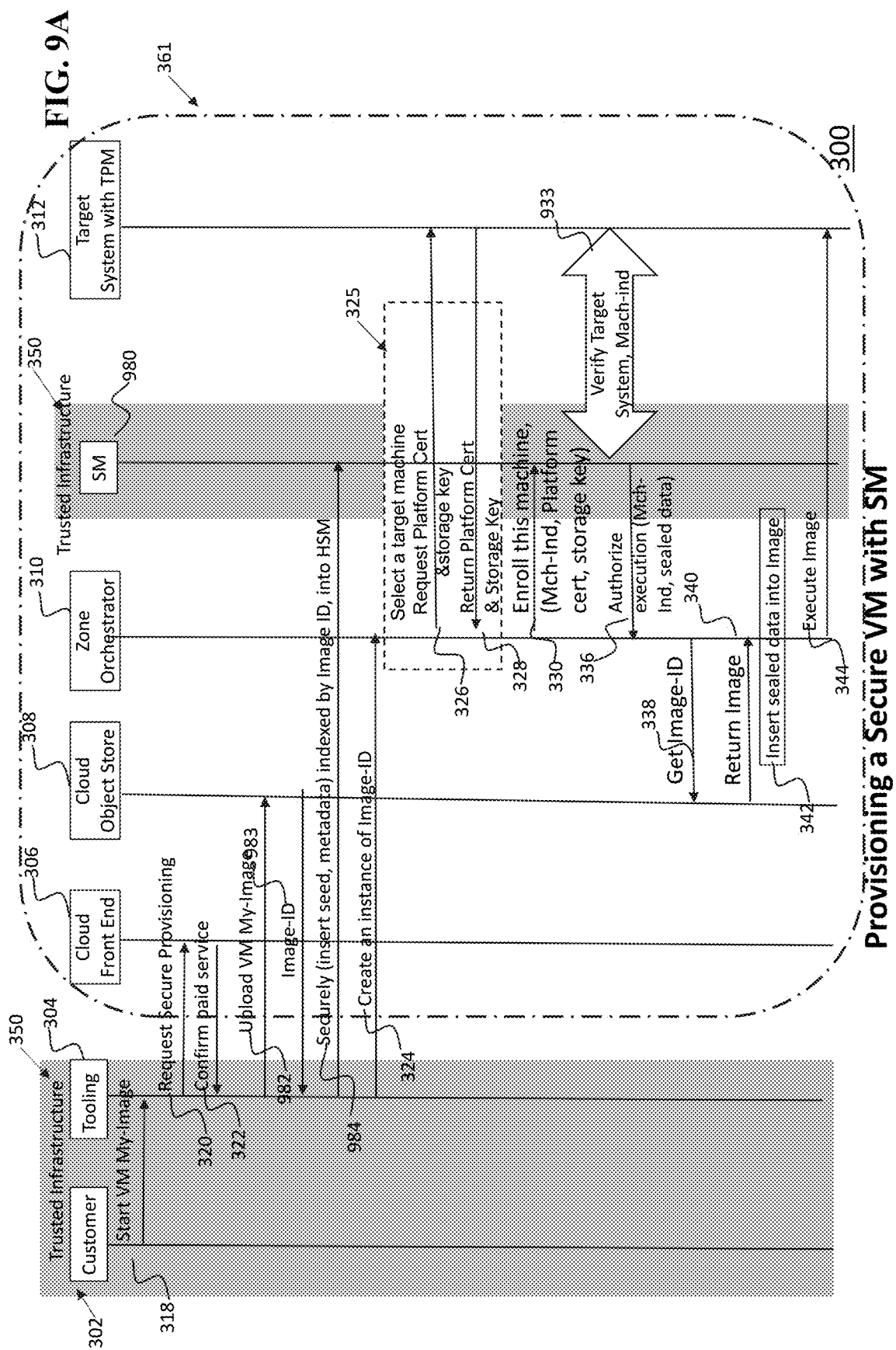

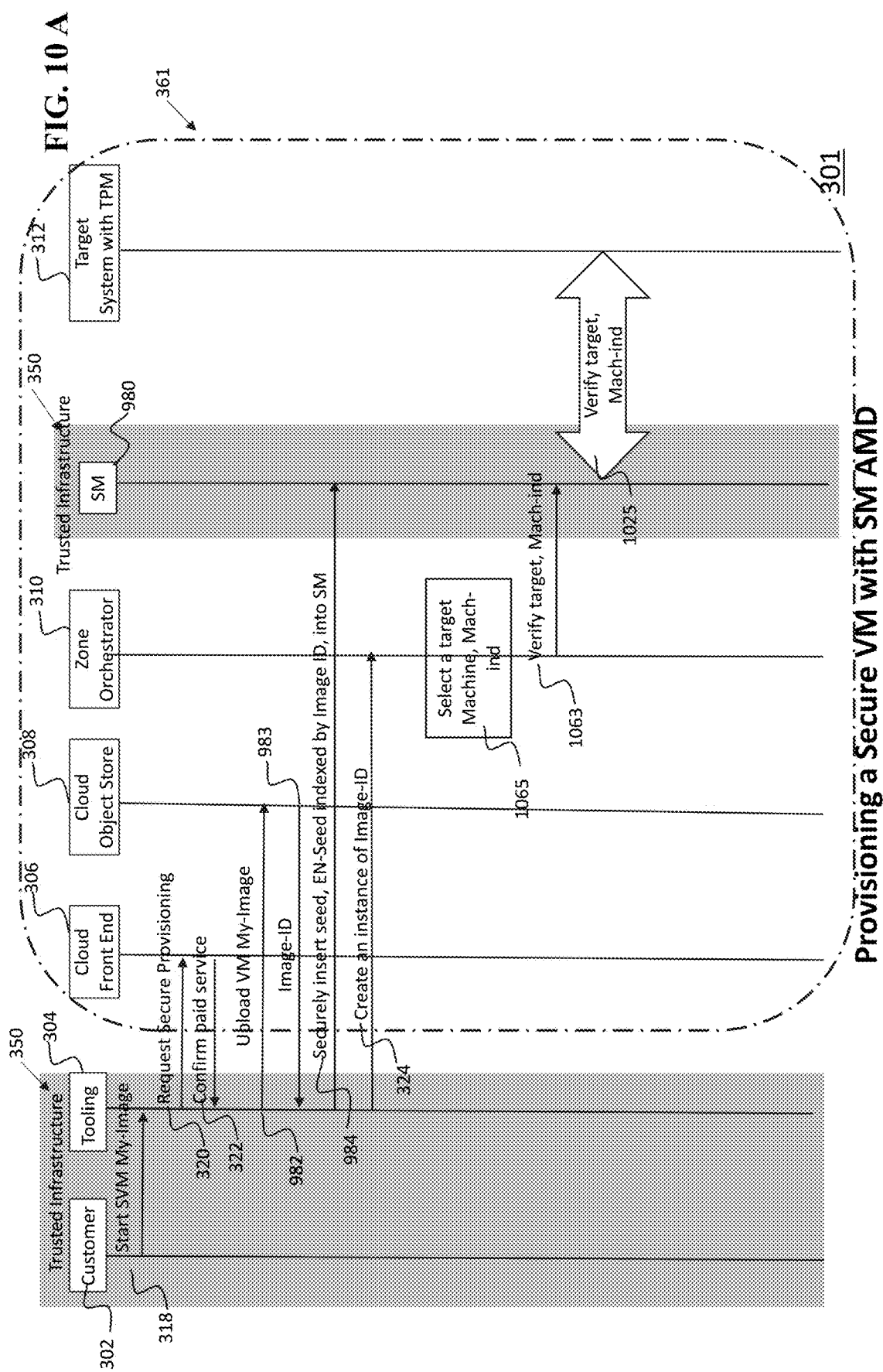

PROVISIONING SECURE/ENCRYPTED VIRTUAL MACHINES IN A CLOUD INFRASTRUCTURE

CROSS REFERENCE TO RELATED APPLICATIONS

The present application is a related application of co-pending U.S. patent application Ser. No. 17/130,238, each of which is filed on Dec. 22, 2020, the entire contents of which are incorporated herein by reference.

BACKGROUND

The present invention relates to an embodiment of a method, apparatus, and system for secure/encrypted virtual machines, and more particularly, but not by way of limitation, relates to a method, apparatus, and system for provisioning secure/encrypted virtual machines in a cloud infrastructure.

Cloud computing is an important aspect of enterprise infrastructure. Cloud infrastructures can either be private, public, or hybrid. One of the principal challenges for hybrid and public clouds is that the enterprise extends a trust boundary to the cloud provider and their personnel. Though cloud is growing dramatically, one of the principal inhibitors is trust. Most cloud infrastructure have a built-in assumption that the cloud provider, and their staff are trusted.

Therefore, a significant hindrance to cloud adoption is security. Therefore, there is a need to provide a more secure cloud computing platform that is efficient to implement and cost effective. Moreover, there is a need to provide a set of protocols, that enable security in cloud computing without having to trust the cloud provider.

SUMMARY

In view of the foregoing and other problems, disadvantages, and drawbacks of the aforementioned background art, an exemplary aspect of the disclosed invention provides a method, apparatus, and system for provisioning secure/encrypted virtual machines in a cloud infrastructure.

According to an embodiment of the present invention, a method for generating a computation such that it will execute in a target trusted execution environment (TEE), including selecting the target TEE, generating an authorization that is satisfied by a TEE, associating the authorization with the computation that executes in the TEE that is authorized, and generating the computation with the associated authorization.

According to another embodiment of the present invention, a system including a memory storing computer instructions, and a processor configured to execute the computer instructions to select a target TEE, generate an authorization that is satisfied by a TEE, associating the authorization with the computation that executes in the TEE that is authorized, and generating the computation with the associated authorization.

According to yet another embodiment of the present invention, computer program product comprising a computer readable storage medium having program instructions embodied therewith, the program instructions readable and executable by a computer to cause the computer to perform a method, including selecting a target TEE, generating an authorization that is satisfied by a TEE, associating the authorization with the computation that executes in the TEE that is authorized, and generating the computation with the associated authorization.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 9A illustrates an alternative security model utilizing an SM of an embodiment of the present invention in a cloud infrastructure.

FIG. 10A illustrates an alternative security model utilizing an SM to provision a TEE in an AMD (ADVANCED MICRO DEVICES) processor of an embodiment of the present invention in a cloud infrastructure.

DETAILED DESCRIPTION

Figure 1:
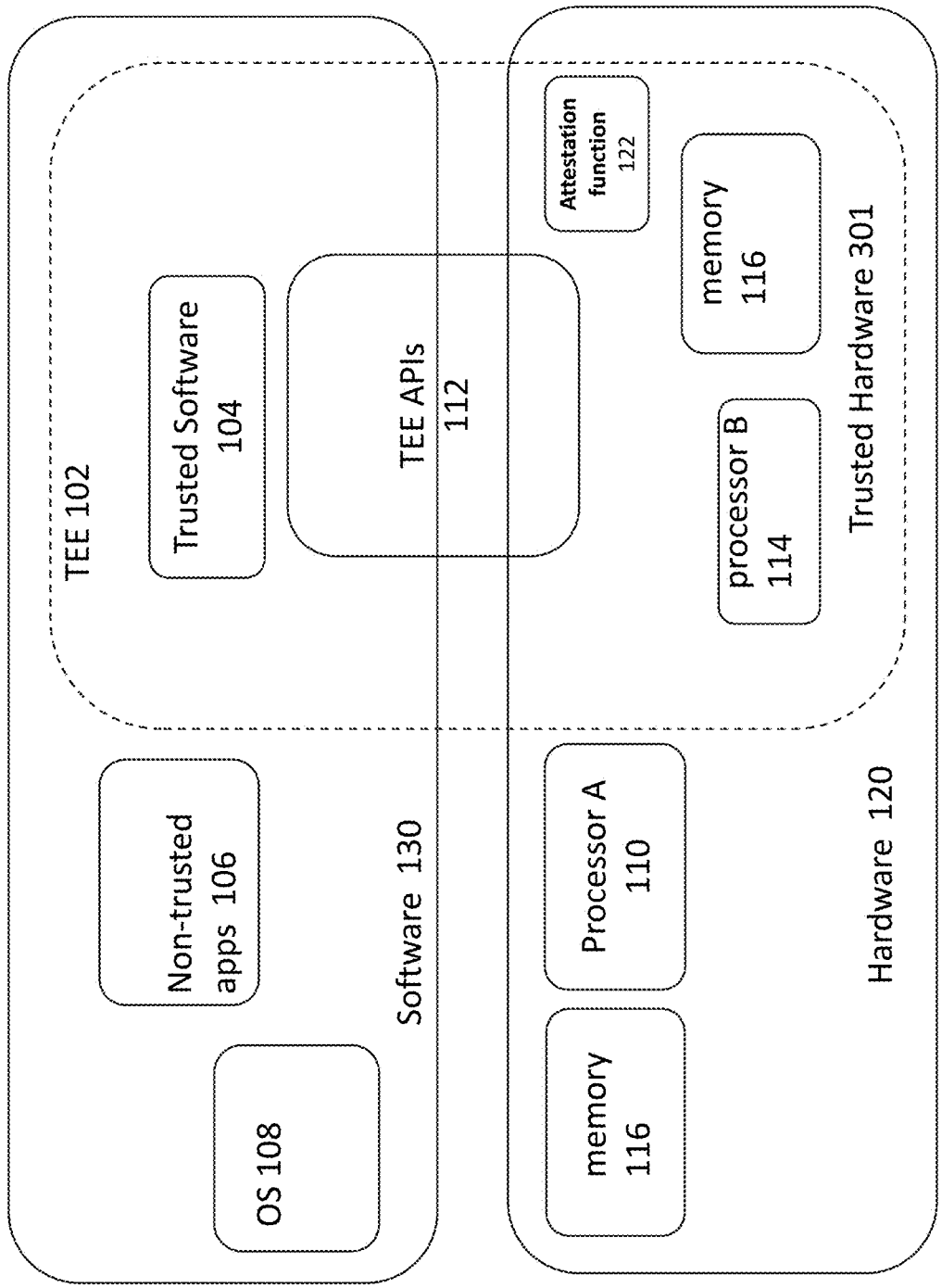
FIG. 1 illustrates an example of a TEE (trusted execution environment) as utilized in the present invention.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims. Moreover, please note that any of the steps can be performed in different sequences or combined or at the same time. In addition, any of structures and embodiments shown can be modified or combined.

As previously mentioned, a significant hindrance to cloud adoption is security. The cloud vendor has access to all the information that is utilized within a running container or VM (virtual machine). In response to this issue, different CPU (central processing unit) vendors have modified their architectures so that private computations can be created and run. The architectural changes generally fall under the heading of a trusted execution environment (TEE). This invention also supports a TEE that is part of a cloud node or infrastructure but not incorporated into any particular CPU architecture.

Processor vendors are providing a means for cloud providers to address the trust gap with the creation of trusted execution environments (TEEs) which provide hardware support for secure execution. TEEs partition a processor or process into secure and non-secure areas. A TEE can be classified based on "granularity", either coarse-grained or fine-grained. Coarse-grained TEEs work, for example, at the VM (virtual machine) or processor level, whereas fine-grained TEEs secure only a process or single thread of execution. Examples of coarse-grained include IBM Secure Service Containers™, ARM (Advanced RISC (Reduced Instruction Set Computer) Machines) TrustZone™ (some do not consider this a TEE), IBM' Protected Execution Facility (PEF) and AMD™ Secure Encrypted Virtualization (SEV). Intel™ Software Guard Extension (SGX) is an example of a fine-grained TEE. Intel has announced the intention to provide coarse-grained support. All TEEs are trusted because of hardware enforced requirements placed on the code that runs in the secure partition and the ability of the user to verify that the hardware is correct.

Most TEEs also offer some form of attestation. The lack of attestation and some other features causes some to exclude the currently existing ARM TrustZone™ as a TEE. However, arm processor can be utilized with an external TPM which could provide a form of attestation. The methods and points where attestation is provided vary. Attestation enables a remote party to assure that the attributes of the TEE are verified which include what software is currently running in the TEE and/or the firmware/software basis of the TEE are verified. Attestation enables a TEE user to verify critical properties about the environment where their code, or secrets, will execute. TEEs are designed with the assumption that an adversary may have physical possession of, control of, or access to, the system/device/PC containing the processor. Their objective is to enable a confidential or secure computation in the presence of adversarial access or control. The architectural changes introduced by the TEE provide defense against adversarial access.

Even with these capabilities, since many cloud infrastructures assume trust of the provider, exploiting TEE to provide confidential computing remains a challenge.

The present invention among other features, identifies a set of protocols and components that when enabled and utilized in a cloud infrastructure allows the customer of the cloud infrastructure to utilize the infrastructure without sharing any of their secrets with the cloud provider. The present invention provides a set of protocols, that enable the user to exploit Protected Execution Facility, or other coarse grain TEEs without having to trust the cloud provider.

The present invention is described using the Protected Execution Facility (PEF) TEE. PEF supports secure computation called secure virtual machines (SVMs). All SVMs start execution as a normal VM, in the course of their initialization they execute an ESM (enter secure mode) ULTRAVISOR call which is a request to transition from a normal virtual machine into a secure virtual machine. PEF requires that a properly configured platform have a TPM and be executing with secure and trusted boot enabled.

The TPM used in the present embodiment represents hardware that is used to hold measurements for an attestation function. The attestation function could be incorporated into a processor or implemented externally to the processor architecture. One refers to TPM PCR which represent any trusted mechanism for recording measurements.

The present invention exploits a TPM (Trusted Platform Module) and TEE hardware that are deployed in a cloud infrastructure. There are two models for exploiting a TEE in a cloud infrastructure, BYOK (Bring Your Own Key) or KYOK (Keep Your Own Key). BYOK required a key safe under the control of the cloud user, such as an SM (security module) 866 in the cloud infrastructure, in order for the user to avoid exposing their key to the cloud provider. Examples of security modules 866 include HSMs (hardware security modules) such as the IBM 4769 Cryptographic Coprocessor™, IBM Hyper Protect™, IBM Z Secure Service Container™, IBM Z Secure Execution™, a TEE, or even a TPM. The sensitive information can be kept in a customer controlled key safe. Whereas KYOK require that the cloud provide detailed information about their infrastructure to the cloud user.

Cloud computing is an important aspect of enterprise infrastructure. Cloud infrastructures can either be private, public, or hybrid. As previously mentioned, one of the principal challenges for hybrid and public clouds is that the enterprise extends it trust boundary to the cloud provider and their personnel. Though cloud is growing dramatically, one of the principal inhibitors is trust. Most cloud infrastructures have a built-in assumption that the cloud provider, and their staff are trusted.

FIG. 1 illustrates an example of a TEE as utilized in the present invention. TEE can be implemented in a number of ways including as modifications to CPU architecture, as an external component plugged into a peripheral interface, or as a completely separate processor with appropriate interfaces and isolation hardware. This embodiment describes a TEE as a single system. However, this invention also works when a TEE represents a properly configured set of systems. The use of TEE refers to one or more properly configured systems. In the software section 130 of the system 100, there is the TEE 102 which includes hardware 120 and software 130. Trusted applications are software that runs inside the TEE. The TEE APIs 112, often implemented in firmware and or hardware provide interfaces to the software running inside the TEE as well as interfaces to software outside the TEE that may want to become secure by running inside the TEE. Processor B 114 in the trusted hardware is the trusted portion of the processor, that the trusted application and TEE APIs execute on. This may be a completely independent processor, or it may refer to trusted state of a single processor. The memory 116 inside the TEE is trusted, the trusted software 104 resides in the trusted memory 116 in the TEE 102. The TEE also includes an attestation function 122. In a preferred embodiment the attestation function is supplied by a TPM. However, any hardware that is used to securely store measurement of firmware and/or software can supply the attestation function.

The trusted software in the TEE may include an entire operating system that is separate from the untrusted OS 108 outside of the TEE 102. When the TEE is fine grain, the OS in the TEE is often called a shim.

Outside of the TEE there is an operating system 108 and applications 106 as well as memory 116 and processing capability 110. None of these components are implicitly trusted by the trusted software 104. Interfaces between the two have to be carefully implemented so as not to compromise trust.

Figure 2A:
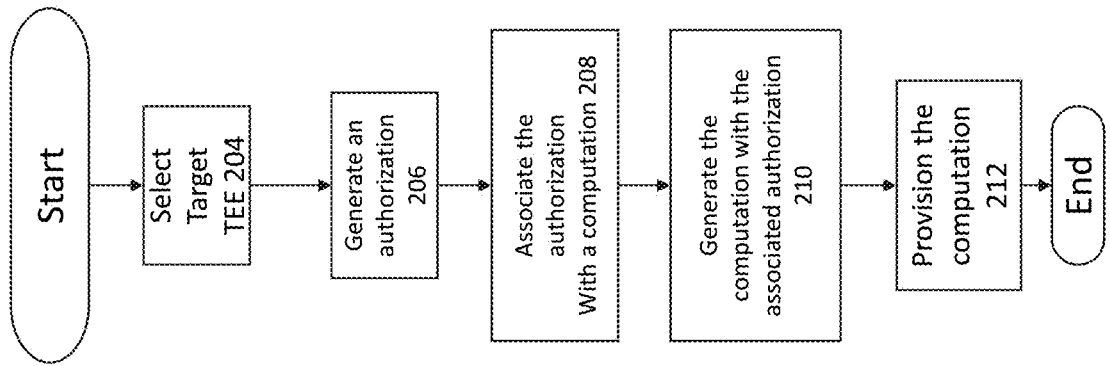
FIG. 2A illustrates an example flow diagram of an embodiment of the present invention.

FIG. 2A illustrates an example flow diagram for provisioning a computation into a TEE as an embodiment of the present invention. Those skilled in the art realize that the preparation of an authorization for a computation to be run in a TEE should be done in a trusted environment but can be done anywhere. Provisioning a computation into a TEE starts with selecting the target TEE 204. Selecting a target TEE requires selecting a system which contains a TEE capable of executing the secure computation. FIGS. 3, 4, 9A, 9B, 10A, and 10B give an example of how a target TEE is selected and what attributes can be verified. In the preferred embodiment, the expected attributes of the TEE are assumed to be known prior to selection. However, anyone skilled in the art realizes that expected attributes could be also be a function of the selected TEE. For example, if a computation that could run on multiple architectures was being provisioned, the required attributed would probably depend on the target architecture. The authorization 206 may restrict the computation to a specific TEE or to a set of TEEs which meet certain criteria. In either case the specific TEE and/or the criteria used to validate the TEE must be known prior to the generation of the authorization. Selecting the target TEE and identifying the criteria are handled in step 204. Those skilled in the art realize these could be two separate steps.

Figure 6:
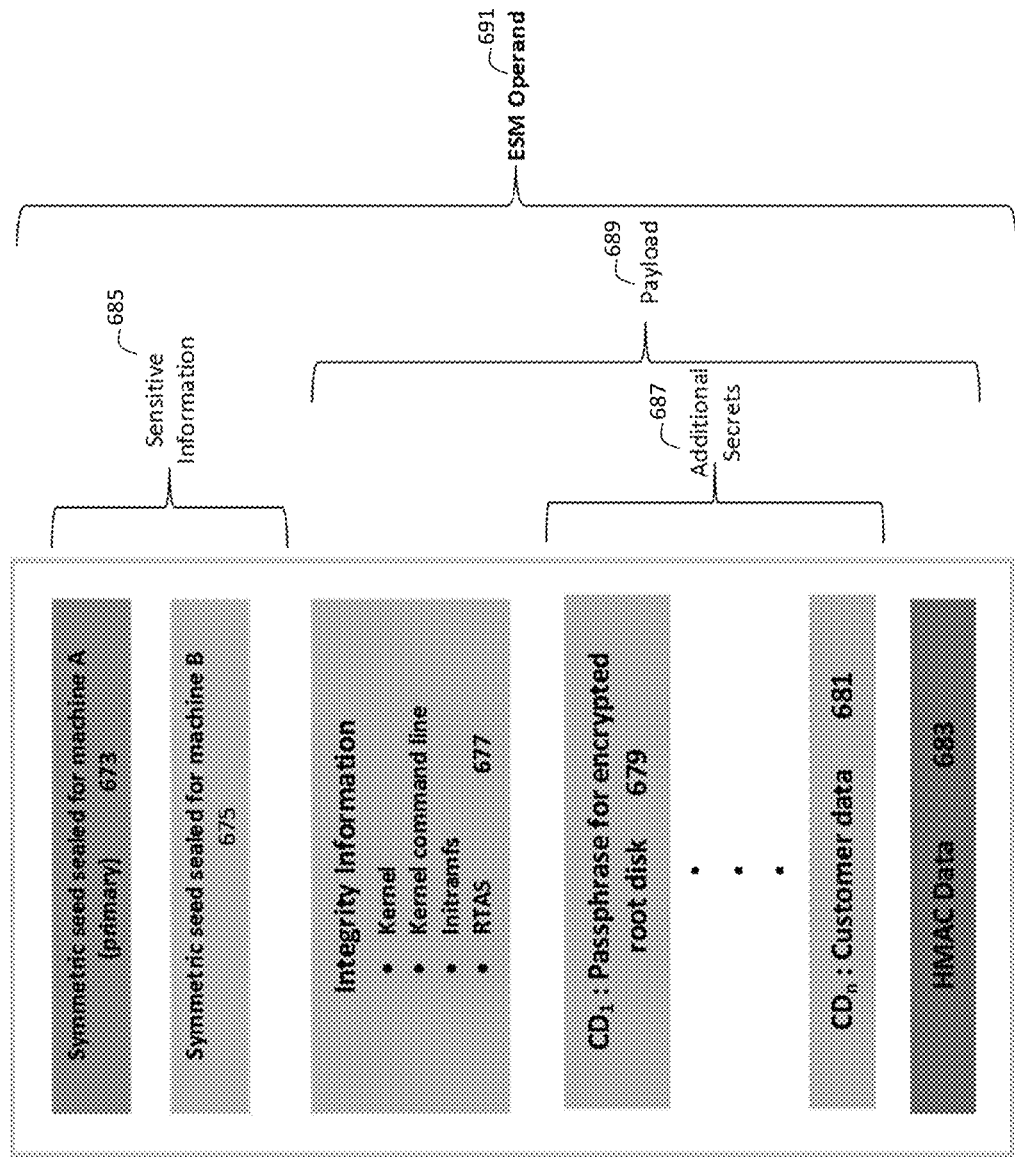
FIG. 6 illustrates a layout of the ESM (enter secure mode) operand.

Generating the authorization is step 206. In general, the authorization restricts the set of TEEs that are authorized to run the secure computation. In the preferred embodiment the authorization is a protected symmetric seed, as illustrated in FIG. 6. In the preferred embodiment each TEE has a key pair. The preferred protection mechanism is to encrypt the seed with a public key associated with the target TEE. Only an authorized TEE has access to the private key. The private key could be locked in a TPM or in some other hardware protected mechanism. The TPM specification defines encrypting with a public key as a seal operation, the results of the seal as sealed data, and decrypting sealed data with a private key as an unseal operation. The authorization can contain an identifier, which indicates which TEE the authorization is for. If its identifier is present, the TEE will validate the authorization.

In the preferred embodiment, a TPM is used to securely hold the private key. In the preferred embodiment, the private key is locked to the TPM and duplication is not allowed. An alternative is that the key is locked to the TPM and duplication is only allowed with a password. However, those skilled in the art know that to provision multiple machines with a single secret, the password must be very securely managed. Those skilled in the art know that the private key can also be kept in some other location protected by a hardware root of trust. When using a TPM, the policy associated with the ability to access the private key to unseal the symmetric key, can restrict the set of systems or the configuration of the systems that are authorized to run the secure computation. For example, in the preferred embodiment the ability to access the public key can required that a PCR match a specific value, such as the one illustrated in FIG. 7A. The illustrated restriction is explained in FIG. 7A. Anyone skilled in the art realizes that authorizations can be made arbitrarily complex. The authorization could be incorporated in sealed data or could be separate metadata.

Associate the authorization with a computation 208. The step of associating the authorization with the computation is explained in FIG. 6.

Generate the computation with the associated authorization 210. The authorization containing the sealed data can be dynamically inserted into the computation. The preferred embodiment inserts the authorization into a previously prepared computation or inserts the authorization as the computation is being prepared.

Finally, the computation is provisioned 212 to the target TEE. An example of a computation provisioned by this invention is a Secure VM. Examples of provisioning a Secure VM into a TEE are given in FIGS. 3 and 4; 9A and 9B; and 10A and 10B.

For some TEE models, the user of the TEE must explicitly verify the TEE is valid prior to the insertion of secrets. In such model the TEE starts up on the target system but cannot be decrypted until an attestation is verified. The target system takes a measurement or has of the state of the TEE after it is secure. Sends that measurement to the user. If the user likes the measurement it authorized the insertion of the secret which enable the TEE to decrypt the computation. This secret is effectively the authorization. Without it the computation will not run in this type of TEE. The association is implicit by having the TEE run in the target system. The generation is the user computing the acceptable values.

Figure 2B:
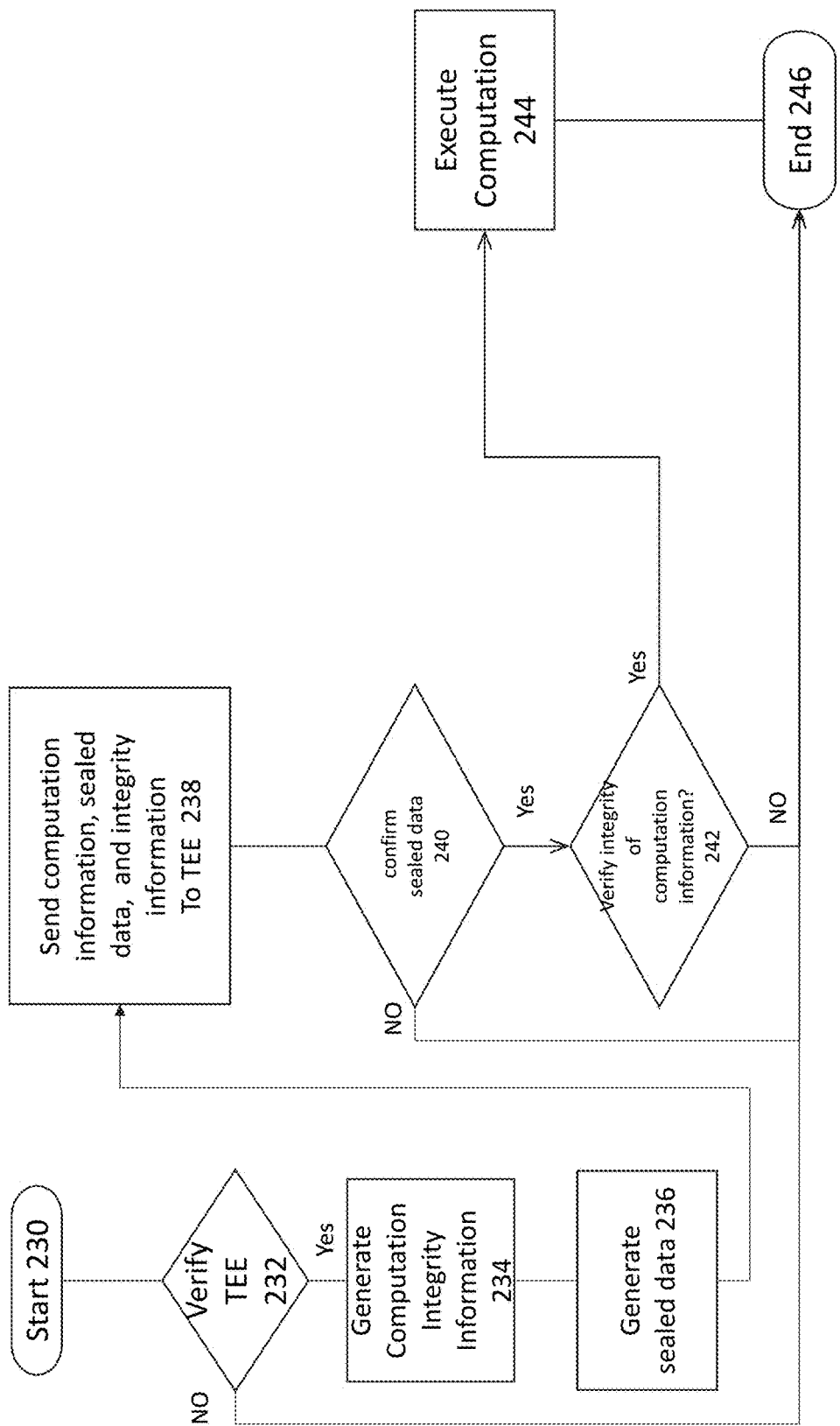
FIG. 2B illustrates an example flow diagram of an embodiment of the present invention.

FIG. 2B illustrates an example flow diagram for provisioning a computation into a TEE as an embodiment of the present invention. The preparation of a computation for a TEE should be done in a trusted environment. Those skilled in the art realize that the preparation of an authorization for a computation to be run in a TEE should be done in a trusted environment but can be done anywhere. The provisioning starts at 230. The first step is verifying the TEE, 232. Examples of verifying a target TEE is found in FIGS. 4, 10A and 10B. If the TEE cannot be verified, provisioning terminates in 246. Next the computation integrity information must be generated, 234. An example of computation integrity information is the Integrity information 677 of FIG. 7. In this description, it is assumed that the TEE where the computation executes will verify the integrity of the computation and fail to execute if there is a problem. Alternatively, the TEE could independently compute the integrity of the computation and return that information, through some secure mechanism, to the owner, where if it was incorrect, the execution of the TEE would be terminated. It is worth noting that for implementations where the owner must verify the integrity of the executing TEE, no sensitive information should be included in the TEE until that is verified. For either approach the integrity information is required. Next the sealed data are generated 236. The sealed data specify whether the TEE is authorized to execute the computation. Those skilled in the art realize that sealed data is a term specific to the TPM. That when data is sealed by a TPM, a policy is associated with the sealed data that must be satisfied in order to access the sealed data. The computation information, sealed data, and integrity information are sent to the TEE, 238. In the preferred embodiment the policy associated with the sealed data is used to validate that the TEE is authorized. This policy is enforced by the TPM. The TEE confirms that it is authorized to execute the computation, 240. If the TEE is not authorized, execution terminates, 246. The integrity of the computation is verified, 242. This could be accomplished by the TEE independently computing the integrity information. It can then verify it matches the integrity information it received, or it could through some secure channel send its calculations back to the initiator and wait for their confirmation. In either case if the integrity of the computation is not verified, then execution terminates, 246. Otherwise the computation is executed, 244.

Figure 3:
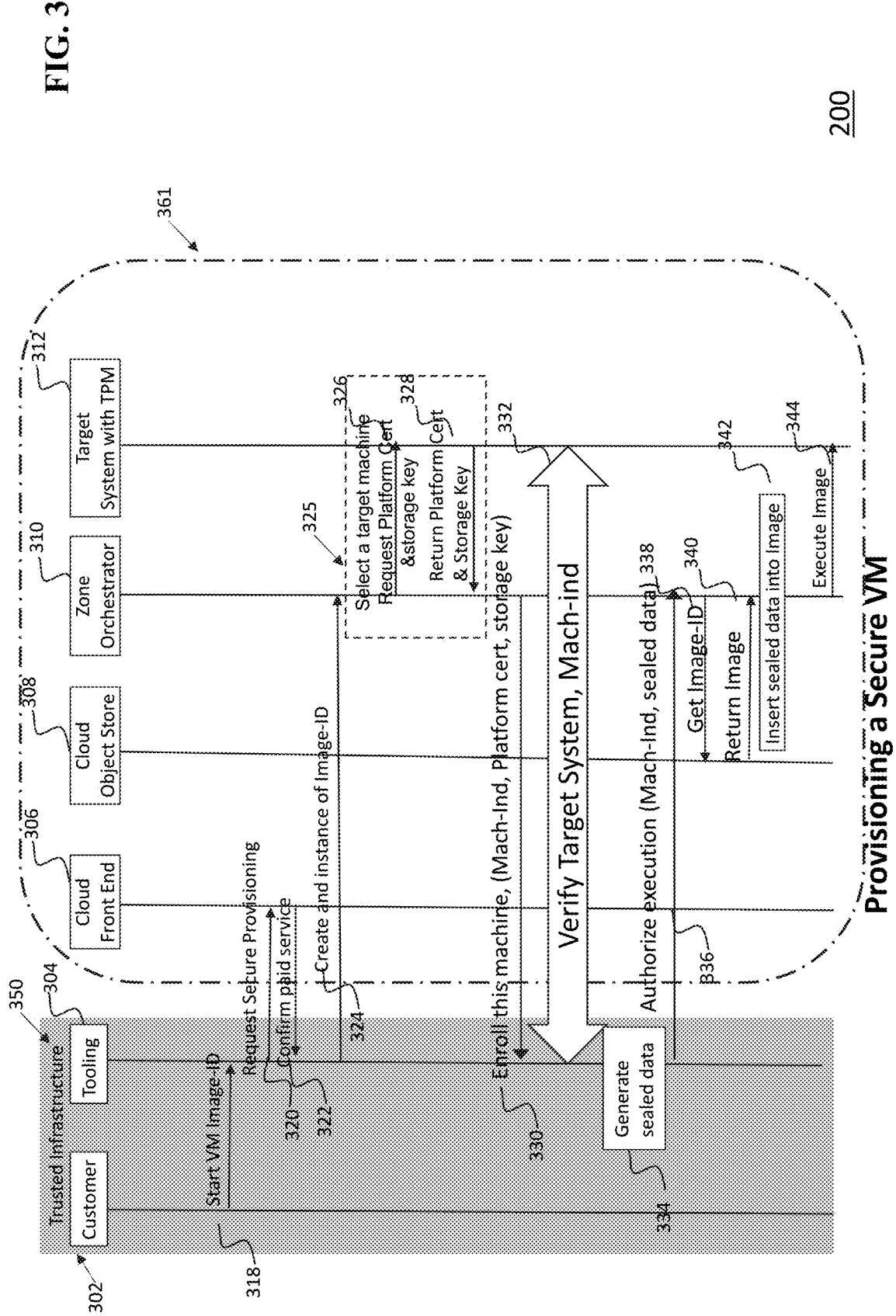
FIG. 3 illustrates a keep your own key flow for alternative security model of an embodiment of the present invention in a cloud infrastructure.
Figure 4:
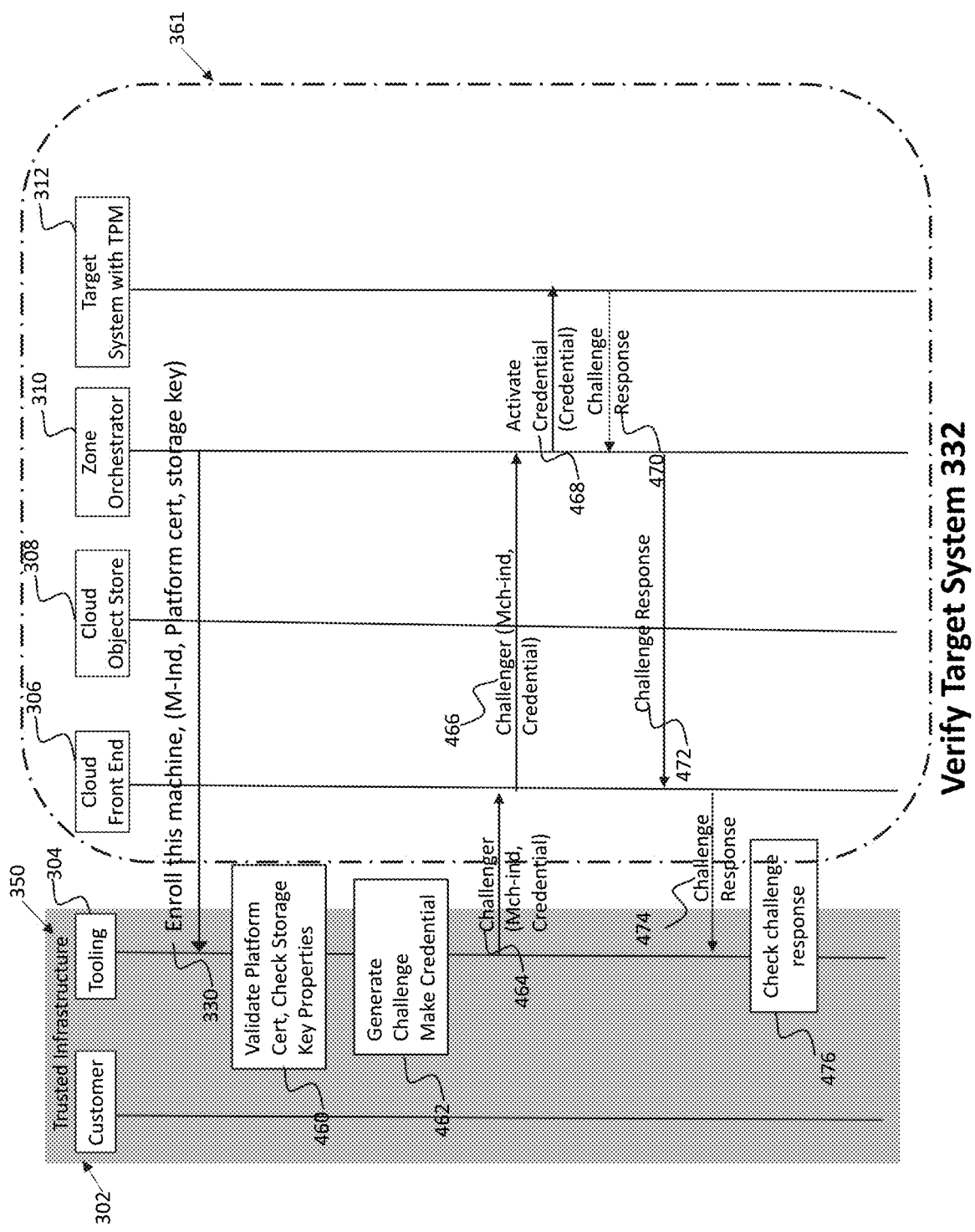
FIG. 4 illustrates the verify target system (i.e., protected execution facility (PEF) system) flow for the keep your own key model, of an embodiment of the present invention in a cloud infrastructure.

FIGS. 3 and 4 illustrate PEF (Protected Execution Facility) Alternative flows where there is no SM (security module) 980.

Specifically, FIG. 3 illustrates a KYOK ((Keep Your Own Key) flow for security model of an embodiment of the present invention.

For the KYOK, the customer is accepting responsibility to run the enrollment protocol. Alternatively, the enrollment protocol must be run by someone trusted by the customer. In this model the customer controls the value of Platform Configuration Register 6 (PCR6) that they trust.

The system 200 is divided into a trusted infrastructure 350 (shown in highlights) and untrusted cloud infrastructure 361 (remaining structures that are not highlighted). The trusted infrastructure 350 (shown in highlights) is shown as the customer 302 and the tooling module 304.

This flow assumes that an VM 416 (not illustrated) with image ID (identification) of Image-ID that can become an SVM has already been loaded into the cloud infrastructure store. To provision a secure VM 416, the customer module (or customer network) 302 request that the tooling 304 starts the VM Image_ID 318. The tooling module 304 requests a secure provisioning 320 with the Cloud front end 306. the Cloud Front end 306 confirms the paid service 322 with the Tooling module 304. The Tooling module 304 request that the Zone Orchestrator 310 create an instance of image-ID 324.

Then the system 200 selects a target machine 325 as follows. The Zone Orchestrator 310 selects a target machine, represented by Mach-Ind, and request the platform certification and storage key 326 from the target system with TPM 312. Those skilled in the art know that existing cloud infrastructures know how to take a list of requirements and select an available machine from their infrastructure. Any technique for selecting such a machine is acceptable. Those skilled in the art realize that the list of attributes for selectin must be augmented with the attributes associated with the target TEE. Further, those skilled in the art realize that Mach-Ind can be an IP address or any other information that can be used to identify a machine within a provider's infrastructure. The target system with TPM 312 then returns the platform certificate and storage key 328 to the Zone Orchestrator 310. The Zone Orchestrator 310 request that the client tooling module 304 enrolls the target machine via Enroll this machine (Mach-ind, platform certificate, storage key) 330.

Then the client tooling module 304 verifies the target system 332

If the target system is verified, then the client tooling 304 generates the sealed data 334. Not illustrated is that if the verify target system 332 fails, the activation stops. The tooling module 304 sends an authorization execution (Mach-ind., sealed data) 436 to the Zone Orchestrator module 310.

The Zone Orchestrator module 310 requests Image-ID (Image identification) 338 from the cloud object store 308. The cloud object store 308 returns the image 340 associated with Image-ID back to the Zone Orchestrator module 310. Then the Zone Orchestrator 310 inserts the sealed data 342 into the image returned from the cloud object store 308. The Zone Orchestrator then passes the image with the inserted sealed data to the target system with TPM 312 instructing the target system to execute the image 344.

FIG. 4 illustrates the details of verify target system 332 (PEF) of an embodiment of the present invention. The trusted infrastructure 350 is shown as the customer module (or customer network) 302 and the tooling module 304. The untrusted cloud infrastructure 361 is also indicated.

The target system is verified in response to the cloud front end 306 requesting the tooling module 304 to enroll this machine at step 330. Verifying the TEE requires verifying the platform certificate and verification that the properties of the storage key are as expected. Then the customer tooling 304 performs validation of the platform certificate and checks the storage, and key properties 460. Not illustrated is that if the platform certificate or storage key properties are not correct, then the verify target system returns a failure. This failure return could cause the tooling 304 to request the Zone Orchestrator to supply a different target system. Continuing with FIG. 4, if the platform certificate and storage key are valid, the customer tooling 304 then generates a challenge and makes credentials 462. The challenge consists of the credential, which is a binary blob that can only be opened by the TPM on Mach-ind (which is used to get the challenge to the correct system). The tooling module 304 sends the challenge 464 to the Cloud Front End 306. The Cloud Front End 306 forwards the challenge 466 to the Zone Orchestrator 310. The Zone Orchestrator 310 forwards the challenge to the target system 312 via activate credential 468 to the target system with TPM 312. Not illustrated is that the Target System 312 issues an activate credential to its TPM and receives a response. The target system with TPM 312 sends the response to the challenge 470 to the Zone Orchestrator 310. The Zone Orchestrator forwards the response to the challenge 472 to the Cloud Front End 306. The Cloud Front End 306 then forwards the response to the challenge 474 to the customer tooling module 304. Then the tooling module 304 checks the challenge response 476 and indicates success or failure.

Figure 5:
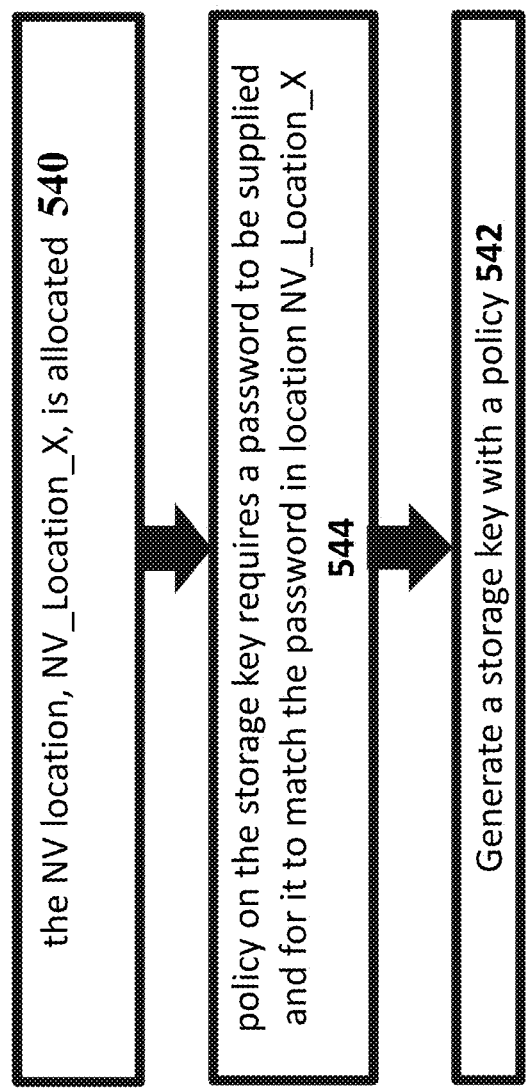
FIG. 5 illustrates a method of provisioning in an embodiment of the present invention.

FIG. 5 illustrates a method of provisioning a machine in an embodiment of the present invention.

One of the embodiments of the present invention utilizes an NV (Non-Volatile) location in the TPM to hold a password. Prior to putting the machine into an infrastructure or as part of provisioning a machine into the cloud infrastructure, the NV location of NV_Location_X, must be allocated (provisioned) with an appropriate policy 540.

The system 500 generates a storage key with a policy that requires a password to be utilized and for it to match the password in NV_Location_X 544. By definition, a storage key is a parent, a child of a parent key does not have to be a key. To use the storage key a password is required 544. The preferred attributes of the storage key should be fixed to TPM, key algorithm can be RSA 2048 (Rivest-Shamir-Adleman cryptosystem with 2,048 bits), key length 2048, authorization is pointer to NV_Location_X, and platform hierarchy. The policy 544 also says that to use the storage key, PCR 6 must match. On every boot, a new password is assigned and given to the ULTRAVISOR. In a preferred embodiment, the password is be regenerated on every boot.

The third step 542 of provisioning is generating the storage key with the previously calculated policy that says the password is required to utilize the storage key is in NV_Location_X. The policy on the storage key requires a password to be utilized and for it to match the password in location NV_Location_X in step 544.

Maintaining the isolation and security of the computation and associated data is the sole objective of the ULTRAVISOR. System management continues to be the responsibility of the hypervisor. The hypervisor uses ultra-calls, to continue managing security sensitive facilities. Where required, the ULTRAVISOR confirms that the action requested by the hypervisor will not affect the security of any running SVM (secure virtual machines).

Therefore, as mentioned, in an example preferred implementation, the storage key is fixed to the TPM, the key algorithm is RSA, the key length is 2048, as well as other attributes. The ability to change the password is tied to TPM platform authorization, which must terminate early in the firmware boot process prior to any OS being loaded into the platform. The firmware in the machine must have the ability to assign a new random password every time the machine is booted and pass that password to the ULTRAVISOR, or equivalent firmware.

FIG. 6 illustrates a layout of the ESM operand 691. The ESM operand 691 can be divided into two large areas, sensitive information 685 and payload 689. The sensitive area contains Sealed data. Each sealed data enables a properly configured system to access the information in the payload area 689 of the ESM operand. Sealed data 673 provides access to machine A and Sealed data 675 provides access to machine B. The unsealed data is the seed used to generate a symmetric key and an HMAC key. Everything in the payload area 689 except the HMAC is encrypted with the symmetric key generated from the seed. The first part of the payload area 689 is the Integrity information 677. This is the information required by PEF to verify the integrity of the computation. It consists of hashes of the kernel, kernel command line, initramfs (initial RAM (random-access memory) and the RTAS area. In a preferred embodiment, the integrity information 677 is encrypted as specified. In an alternative embodiment, the integrity information is not encrypted. Since PEF validates the integrity of the computation without contacting the creator, this information is generated when the secure computation is created and place in the ESM operand. (For technologies where the owner/user of the computation is contacted to verify the integrity of the computation the information must be calculated by the TEE.) The remaining information in the payload area 689 are the secrets 687. These are represented at CD' through CD, CD stands for "Customer data". The preferred embodiment integrity protects 677 the kernel, initramfs, kernel command line, and RTAS of the VM. The boot disk should be encrypted. In the preferred embodiment, the first block of customer data 679 contains the passphrase that protects the root disk which is encrypted with the symmetric key. There can be zero or more blocks of customer data after the encrypted pass phrase. Each of the secrets 687 is encrypted with the symmetric key generated from the seed.

Figure 7A:
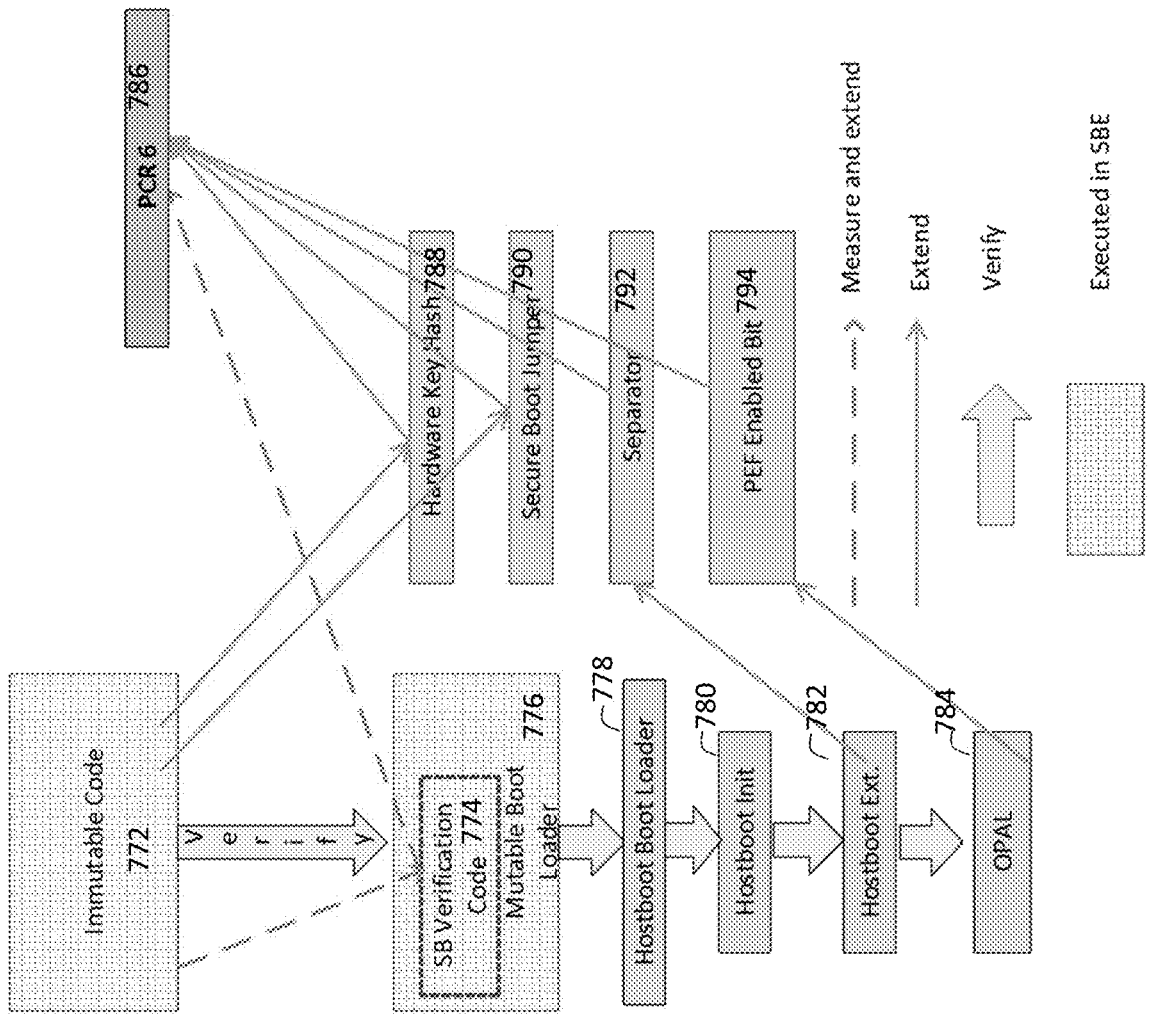
FIG. 7A illustrates values extended into PCR 6 (platform configuration register 6) for validation of the hardware configuration in an embodiment of the present invention.

FIG. 7A illustrates values extended into PCR 6 786 for validation of the hardware configuration in an embodiment of the present invention. The preferred embodiment relies on secure and trusted boot to be able to confirm that the hardware and firmware configuration are valid. The values represented here are a preferred set of values. An alternative implementation could use different values. Anyone skilled in the art understands that PCR 6 786 is representative of a PCR that is being used to hold the value and that whatever PCR is used, it must also appear in the policy of the sealed data (not illustrated in FIG. 7A) for the verification to occur. It is important to note that this embodiment only identifies the actions of mutable and/or immutable code that are necessary for the present invention. The Mutable Boot Loader 776 and Immutable Code 772 described herein execute in the self-boot engine (SBE) and perform many actions not herein described. If secure and trusted boot is enabled whenever a signature verification fails, execution terminates. When the system is powered on, the Immutable Boot Loader 772 is the first running code. The Immutable Boot Loader 772 extends the Hardware Key Hash 788 and the Secure Boot Jumper 790 into PCR 6 786. The Hardware Key Hash 788 is a hash of the cryptographic keys that are being used to verify signatures on the cryptographic keys that are used to verify the signature on the firmware. The Secure Boot Jumper 790 identifies whether secure boot is enabled or disabled. Prior to passing control to the Mutable Boot Loader 776, the Immutable Code 772 loads and verifies the signature of the Mutable Boot Loader 776. If the signature verifies, the Immutable Code 772 extends into PCR 6 786 a hash of the SB Verification Code 774, which is the portion of the Mutable Boot Loader 776 that verifies the signature of other code. It then passes control to the Mutable Boot Loader 776. The Mutable Boot Loader 776 verifies the Hostboot loader 778. The Hostboot loader 778 verifies Hostboot Init. (initialization) 780. Hostboot Init 780 verifies Hostboot Ext. (extensions) 782. Host boot Ext. 782 extends a Separator 792 into PCR 6. Host boot Ext. 782 verifies OPAL 784. OPAL 784 extends the PEF Enable Bit 794 into PCR 6 786. FIG. 7A describes how the value of PCR 6 786 will be generated when properly configured hardware is booted. In the preferred embodiment the policy associated with the sealed data requires that PCr 6 match this value. Other values can be extended into PCR 6 (or another PCR) as desired, whatever an implementation requires to properly verify it configuration. The authorization policy required by this invention can be generated in the same way, extending values into a physical or virtual PCR, by software using a virtual TPM, actual TPM, or reimplementing the operations performed by a TPM (not recommended). The policy specifies the state of the Hardware Key Hash 788, Secure Boot Jumper 790, hash of the SB Verification Code 774, Separator 792 used by the firmware, and the PEF Enabled Bit 794 that are required for the TEE to be authorized to run the secure computation.

Figure 7B:
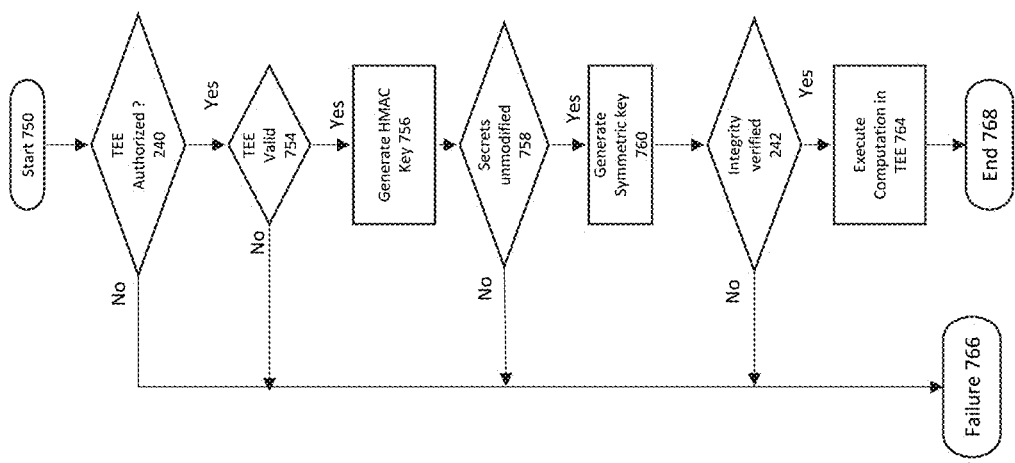
FIG. 7B illustrates validating the computation in an embodiment of the present invention.

FIG. 7B illustrates confirming the authorization requirements 240 and verifying the integrity of computation information 242 in an embodiment of the present invention that uses PEF. As previously mentioned, the secure computation starts as a normal VM. It executes an ESM ULTRAVISOR call to transition to a secure VM running in the PEF TEE at this point the validation starts, 750. In the preferred embodiment the ESM Ultra-call requires an ESM Operand 691, illustrated in FIG. 6. If the ESM operand is not present the ESM ultra-call fails. The TEE checks to see if it is authorized, 240 to execute the secure VM. If it is not authorized execution terminates 766. If it is authorized, it checks to see if it is a valid TEE, 754 a valid TEE meets the sealed data policy specified by the SVM creator. For PEF this check is done by the TPM when the ULTRAVISOR request the TPM to extract the seed from the sealed data. If the TEE does not meet those requirements, execution terminates 766. Since the TEE is authorized and meets the requirements, it has access to the symmetric seed needed to generate an HMAC key and, if integrity is valid, a symmetric key. It next generates the HMAC key, 756. It uses the HMAC key to validate that the encrypted information in the ESM operand has not been modified, 758. If the encrypted information has been modified, execution terminates 766. Otherwise the symmetric key is generated, 760. This gives the TEE access to the information required to verify the integrity of the computation, 242. If the computation has been modified, execution termimates, 766. Otherwise the VM completes the transition into an SVM and executes 764, which successfully ends the transition 768, the VM is now an SVM.

Provisioning

Figure 8:
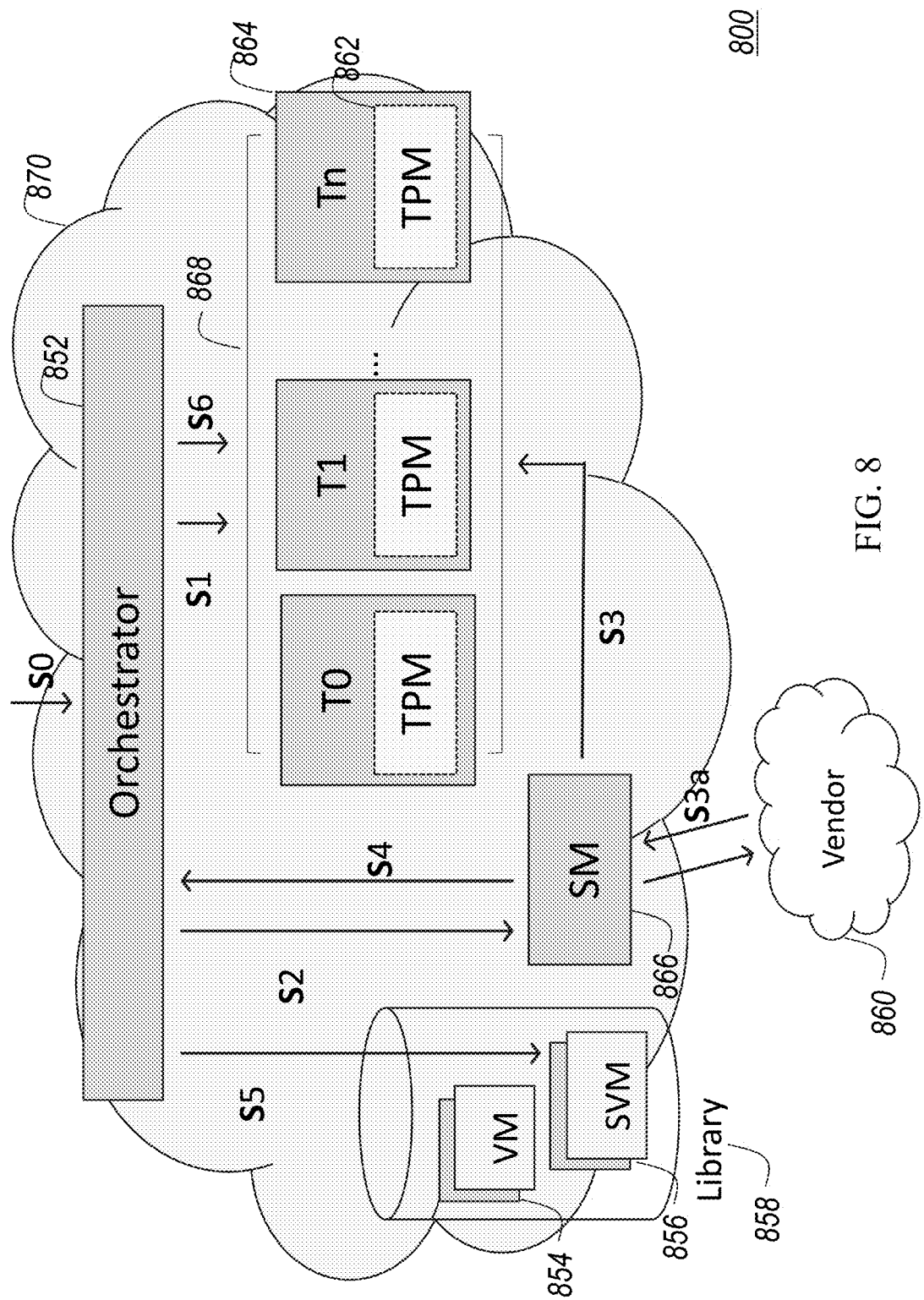
FIG. 8 illustrates an example, protected execution facility (PEF), of an embodiment of the present invention.

FIG. 8 illustrates an example protected execution facility (PEF) of an embodiment of the present invention. The system 800 requests SVM (Secure Virtual Machine) execution (S0). Then, the Orchestrator module 852 selects a target machine from among T0 . . . Tn 864 (S1). The Orchestrator module 852 asks SM (security module) 866 to validate the selected target machine, one of T0 . . . Tn, 864 (S2). In FIG. 5 the selected target is Tn, 864. The SM 866 request information (platform certification, storage key structure, HW (hardware) key hash) from the selected target system 864 (S3). The SM 866 has to validate that these are correct. In order to do the validation, it has to have the public key of the vendor of the platform. Once it acquires the key it can store the key internally to speed the validation process. The SM 866 validates a machine with the vendor's 860 (S3a) public key, it will contact the vendor if it does not already have it. The SM device 866 sends a sealed data to the Orchestrator module 852 (S4). The Orchestrator module 852 retrieves a copy of the selected SVM 856 from the Library 858 S5. Note that in PEF all SVMs start execution as a VM 854. As far as the Library 858 is concerned all images are VMs 854. To simplify the description of the invention those VMs 854 which can become SVMs have been labeled as SVMs 856 in the Library 858. Anyone skilled in the art knows that the Library 858 can be implemented to know the difference or to not know the difference. The Orchestrator inserts the sealed data into the copy of the SVM. The Orchestrator module 852 dispatches the copy of the SVM 856 on target system 864 (S6). For cloud infrastructures 870, the target system 864 will in general not be known at the time the SVM 856 is created. The Cloud providers must be able to make changes to their infrastructure (e.g., to perform daily maintenance, upgrades, etc.) without impacting existing SVMs 856. One of the key attributes of the PEF ESM (Enter Secure Module) operand that it enables easy integration into a cloud infrastructure 870 is that the HMAC (Hashing for Message Authentication Code) does not cover the sealed data. This means that the sealed data does not have to be generated at the same time as the rest of the ESM operand allowing it to be inserted into the ESM operand just prior to execution. In a preferred embodiment, place holder sealed data could exist in the ESM operand, this would be overwritten by the sealed data for the selected machine. In an alternative embodiment, the image with the sealed data could be stored in the Cloud Object Store 308. This would be useful in alternative embodiments were the TEE represents a set of systems. The Cloud Object Store 408 could also store metadata that indicated whether the sealed information was already present. When present, the VM can be directly dispatched to the TEE (set of machines). The ESM operand is a digital blob that is placed in a reserved section of the initramfs. It can also be placed in an ELF (executable and linkable format) section of the zImage (self-extracting compressed image) format file that contains the kernel. All of the information necessary to verify the validity of the SVM is included in the ESM operand.

One example deployment model includes using a security module (SM) 866 or equivalent function in a cloud provider's infrastructure to dynamically generate sealed data. In the present invention, the master secrets can be owned/controlled by the cloud customer, while the hardware is controlled/owned by the cloud provider. This way, the cloud provider cannot extract information from the SM 866; consequently, it is safe for the cloud customer to put secrets associated with their secure computations inside the SM 866. An example of an SM that can be owned by a cloud provider but controlled by a customer is the IBM 4769. The capabilities described in this invention do not currently exist in the 4769 but could be added. Because the SM 866 is in the cloud provider's infrastructure, it is safe for the cloud provider to allow it to run the necessary protocols to generate the sealed data for target machine. No details of the cloud infrastructure will be provided to the cloud customer. It is important to note at this point that in PEF all SVM (secure virtual machine) start executing as NVMs (normal virtual machines), early in their execution they execute an ESM (enter secure mode) ultra-call which is a request to transition into an SVM. It is also important to note that from the perspective of the cloud provider, an NVM image and an SVM image are identical. The cloud customer needs to inform the cloud provider that a particular image is for an SVM so that it will be properly processed. In the description of deployment, it is assumed that the VM (virtual machines) image that will transition to an SVM (secure virtual machine) 856 is already created and that the associated symmetric seed and associated meta data is already in the SM 866. Finally, it is assumed that given the identity of the VM, the SM 866 will select the correct symmetric seed using the associated meta data.

Referring further to FIG. 8, the overall process for running an SVM 856 is illustrated. The cloud user requests that a running instance of a previously created SVM 856 be created. The cloud infrastructure 870 selects a target machine 864 and extracts the platform certificate and storage key from the target. The infrastructure forwards the target machine, 864 platform certificate and storage key to the SM 866 under control of the customer and request enrollment of the target machine 864 for the SVM. In an alternative embodiment the cloud infrastructure forwards only the target machine and request the SM to enroll the target machine. The SM extracts the platform certificate and storage key from the target machine itself, then proceeds with the enrollment process. If the enrollment is successful, the SM 866 will return a sealed data for the target machine 866 to the cloud infrastructure 870. The infrastructure retrieves a copy of the image, 856, from their Library 858, inserts the sealed data into the ESM operand of the SVM 856 using tooling, and provisions the copy of the image, 856, containing the inserted sealed data to the target machine 864. Since the newly inserted sealed data is for the target machine 864, if there are no other issues the VM will successfully transition into an SVM 856. This model assumes that the customer will have one seed per SVM 856 and that this seed will be valid on all target systems 866. Other models are possible, in particular, this embodiment is written as if a selected target, 864 is a single machine. However, those skilled in the art realize that a target could be either a single machine, 864 or a set of machines, 868 depending on how the infrastructure is provisioned. The sealed data can be inserted into the computation dynamically.

The enrollment protocol includes the following. The SM 866, or equivalent function, has to run the enrollment protocol. The enrollment protocol requires that the cloud infrastructure 870 pass in the machine indicator (such as IP (Internet Protocol) address), platform certificate, SVM indicator and storage key of the target machine to the SM 866. In an alternative embodiment the cloud provider passes only the machine indicator to the SM and the SM extracts the platform certificate and storage key itself. In either embodiment, the SM 866 will validate the platform certificate and check that the storage key properties are correct. If the platform certificate and storage key pass the checks, then the SM 866 will generate a random challenge and make credential. It will then send an activate credential to the target machine 864 that is to be executed on its TPM, 862. The target machine 864 will return the challenge response. If the challenge response is valid, the SM 866 will generate a sealed data for target machine 864 and return it to the cloud infrastructure 870 of the present system 800.

The enrollment protocol only has to be run once for each target. Therefore, if the SM 866 maintains a database of enrolled machine, it can check to see whether the current target machine is enrolled. If it is already enrolled, it can skip enrollment and directly generate the sealed data. Also, each hardware key hash only has to be verified once. The SM 866 can maintain a database of validated hardware key hashes. Before the system 800 runs the protocol to the vendor 860 to verify the hardware key hash, the system 800 can check to see if the hash from the target machine 864 has already been validated. This is not as much of an optimization for PEF because hardware key hashes are validated when the SVM is created and not once for each execution. If a key hash becomes invalid, it has to be purged from the SM 866. When a machine is deprovisioned from the cloud infrastructure 870 of the present system 800, the SM 866 must be informed that the machine is no longer a valid target so it can clean its internal databases. Finally, the primary seed in the TPM 862 must also be cleared when the machine is deprovisioned to assure that the deprovisioned machine cannot be used to extract secrets form previously authorized SVMs 866.

FIGS. 9 and 10 illustrate a PEF (Protected Execution Facility) utilizing a SM to verify the target system.

The initial approach illustrated in FIGS. 3 and 4 requires the infrastructure provider to expose details, such as the IP (Internet Protocol) address of servers, to their users for the user to confirm that the intended target machine is acceptable and to configure the computation to run on the intended target. The required API reduces the transparency of the cloud providers infrastructure to the cloud users.

Some Cloud providers do not want to expose details of their infrastructure, because it makes transparently managing their infrastructure significantly more complicated. The present invention can accomplish the same objective, provisioning a secure computation to a TEE, without exposing details if the infrastructure to the cloud customer by including an appropriately configured SM. The SM must be under the control of the customer exploiting TEEs. The SM must be configured to run the previously described verification flows as illustrated in FIGS. 9 and 10. The customer must securely insert their secret into the SM.

Figure 9B:
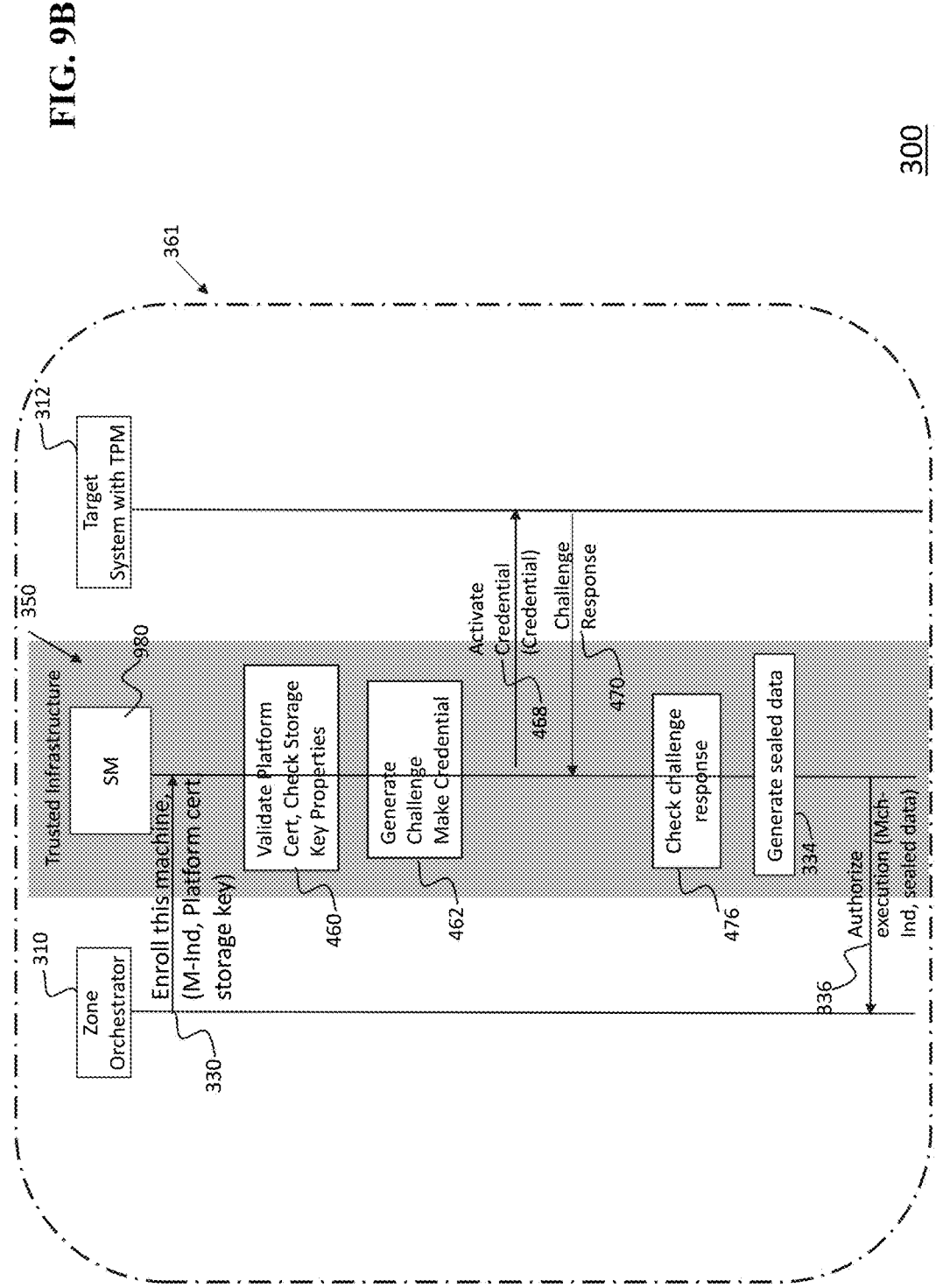
FIG. 9B illustrates the verify target system (i.e., protected execution facility (PEF) system) flow for the alternative model that utilizes an SM of an embodiment of the present invention in a cloud infrastructure.
Figure 10B:
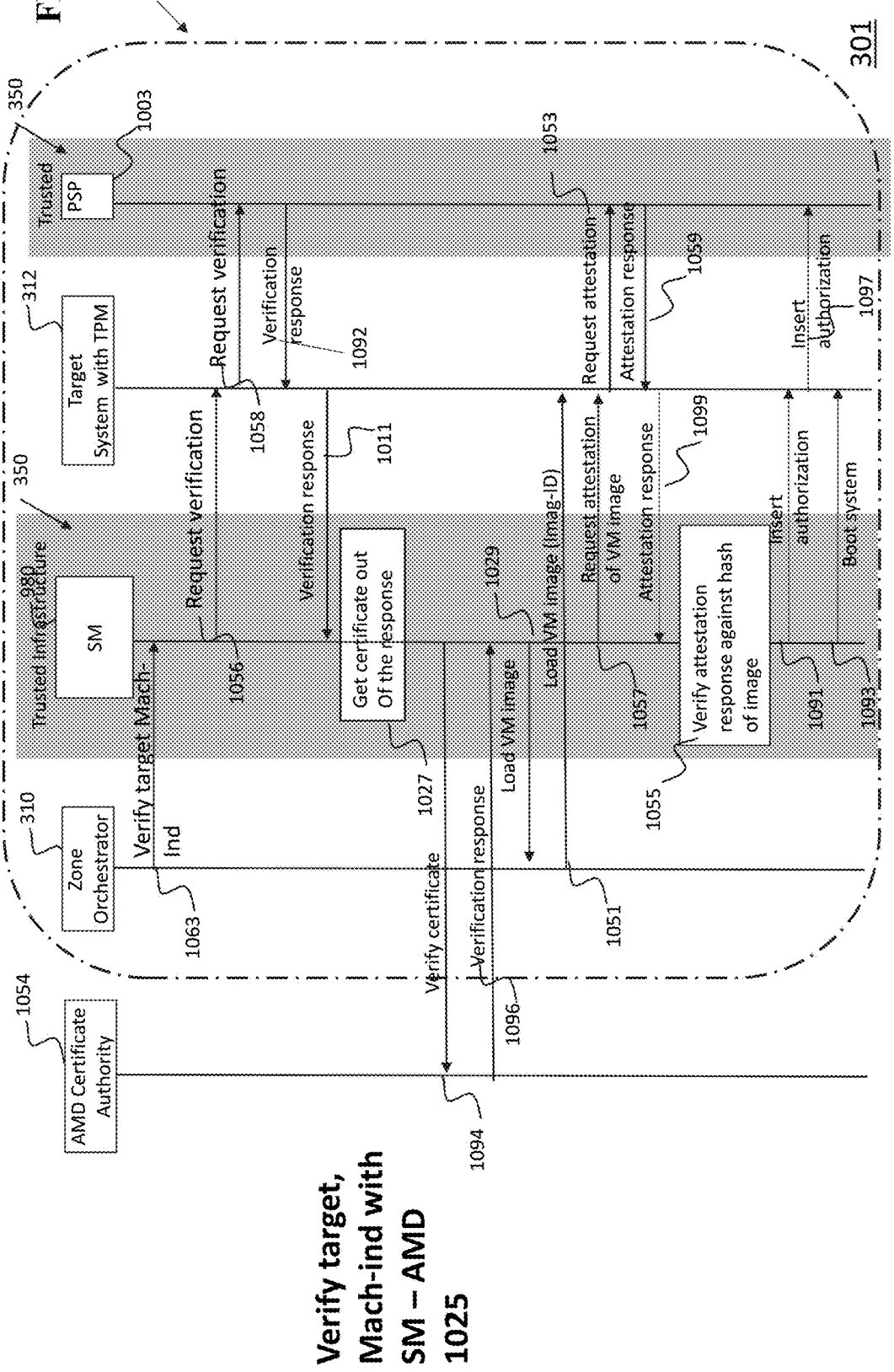
FIG. 10B illustrates the verify target system (i.e., protected execution facility (PEF) system) flow for a TEE in an AMD (ADVANCED MICRO DEVICES) processor for the alternative model that utilizes an SM of an embodiment of the present invention in a cloud infrastructure.

FIGS. 9A, 9B, 10A, and 10B describe how the present invention works in a PEF TEE. PEF and similar TEEs are designed so that the TEE attests to the integrity of the computation without requiring a separate verification with the user/owner of the TEE. FIGS. 10A and 10B describe how the present invention works with a TEE, such as AMD SEV, that requires the owner/user of the secure computation to explicitly authorize the computation after it has been loaded into a valid TEE. In both cases both the TEE and the computation are attested/verified. FIGS. 9A, 9B, 10A, and 10B do not assume that the customer has preloaded a VM image. Customers can preload a VM image, My-Image 482, which would imply that they already know the Image-ID 483.

FIG. 9A illustrates PEF (Protected Execution Facility) Alternative utilizing an SM (security module) in an embodiment of the present invention. This flow does not assume that an VM, that can become a VM, with image identity of Image-ID has already been loaded into the Cloud Object Store 308. The trusted infrastructure 350 is the customer module 302, tooling module 304 and the security module (SM) 980. In this alternative embodiment, the SM 980 is trusted even though it is part of the untrusted cloud infrastructure 361.

To provision a secure VM, the customer module 302 requests its trusted tooling 304 to start an SVM My-Image 318. The tooling module 304 requests a secure provisioning 320 with the Cloud front end 306. The Cloud Front end 306 confirms the paid service 322 with the Tooling module 304.

Next, the Tooling module 304 uploads a VM MY-Image 982, which can transition to an SVM, to the Cloud Object Store 308. The cloud object store 308 then sends back the Image-ID 983 to the Tooling module 304. The tooling module 304 sends a command to securely insert seed, metadata, which will be indexed by Image-ID, into SM 984 to the SM 980. Those skilled in the art realize that the image could have been preloaded, in which case the Image-ID would have been known. The Tooling module 304 request that the Zone Orchestrator 310 create an instance of Image-ID 324.

Then the system 300 selects a target machine 325 as follows. The Zone Orchestrator 310 selects a target machine request platform certification and storage key 326 from the selected Target System with TPM 312. The target system with TPM 312 then returns the platform certification and storage key 328 to the Zone Orchestrator 310.

Then the Zone Orchestrator 310 request that the SM 980 enrolls this machine (Machine-ind, Platform Certification, and Storage Key) 330. The SM 980 is trusted infrastructure 350 by the customer module 302.

Then SM runs Verify Target System Mach-ind 933 with the Target System with TPM 312. If the verification fails, activation terminates. If the verification succeeds, the SM 980 returns Authorizes Execution (Machine-ind., sealed data) 336 to the Zone Orchestrator 310.

Then Zone Orchestrator module 310 requests Image-ID 338 from the cloud object store 308. The cloud object store 308 returns the image 340 associated with Image-ID back to the Zone Orchestrator 310. Then the Zone Orchestrator 310 inserts the sealed data 342 into the image returned by the Cloud Object Store 308. The Zone Orchestrator 310 then sends the image with the inserted sensitive data to the selected machine Target System with TPM 312 with a command to execute the image 344.

FIG. 9B illustrates flows required between the Target System with TPM 312 and the SM 980 to complete Verify Target System Mach-Ind 933 in an embodiment of the present invention. As highlighted the trusted infrastructure 350 includes the SM 980. The Zone Orchestrator 310 and target system with TPM 312 are outside of the trusted infrastructure 350 in the untrusted cloud infrastructure 361.

The Zone Orchestrator 310 sends and enrolls this machine (Machine-ind, Platform Certification, and Storage Key) 330 requests to the SM 980.

The SM 980 validates the platform certificate and performs a check of the storage key properties 460. The SM Hyper Protect 980 generates a challenge and makes credentials 462 which creates a binary blob called Credential which can only be by the TPM that was validated in 460. The SM 980 sends an Activate Credential (Credential) 468 to the target system with TPM 312. The target system with TPM 312 then returns the challenge response 470 back to the SM 980. The SM 980 checks the challenge response 476. If the challenge response is incorrect, activation terminates, and a failure indication is returned from this process. If the challenge response is correct the SM 980 generates a sealed data 334 utilizing the policy that was passed as metadata with the seed. The SM 980 returns an Authorize execution (machine-in, sealed data) 336 to the Zone Orchestrator 310.

FIG. 10A illustrates an alternative security model utilizing an SM to provision a TEE in an AMD processor of an embodiment of the present invention in a cloud infrastructure. In FIG. 9B the customer module 302 has their trusted infrastructure 350 and is using a cloud provider 361. Within the cloud provider the customer is using a security module (SM) 980 which they have control of and is trusted 350. The remainder of the cloud provider's 361 infrastructure is untrusted. The customer module 302 sends a request to their trusted tooling 304 to start SVM My-Image. The tooling 304 request secure provisioning 320 from the cloud front end 306. The cloud front end 306 confirms paid service 322. The customers tooling uploads their image My-Image to the cloud object store 982. The cloud object store 308 returns 383 the image identifier, Image-ID, of the stored image to the customer tooling 304. The customer tooling 304 securely inserts the seed 384, which is also referred to as detailed information or sensitive information, indexed by Image-ID into the security module (SM) 380. This insertion may include additional meta data to be associated with the Image-ID. The customer tooling 304 then requests that the Zone Orchestrator 310 create 324 an instance of Image-ID. The Zone Orchestrator 310 selects 1065 a target machine 312 Mach-Ind. Next the Zone Orchestrator 310 request that the security module 380 verify 1063 the target machine 312 Mach-Ind. The security Module verifies the target machine 1025.

FIG. 10B illustrates the verify target system (PEF) flow for a TEE in an AMD processor for the alternative model that utilizes an SM of an embodiment of the present invention in a cloud infrastructure. FIG. 10B gives the details of the verify target machine 1025 request from FIG. 10A. The verify 1063 Mach-Ind request is received from the Zone Orchestrator 310 by the security module (SM) 980. Because the target system 312 contains an AMD process with TEE, FIG. 10B has been expanded to include the PSP 1003 in the target system which can be trusted 350 if it is certified. It is important to note that the PSP is a subcomponent of the AMD processor which is expanded in FIG. 10B to clarify the flows. Another important point is that communication between the SM and the PSP is secure and cannot be forged in either direction. This description is an overview of the process. The details are in AMD white papers and technical documents, which anyone skilled in the art can acquire. The SM issues a request verification 1056 request to the target system 312, which passes the request 1058 to the PSP 1003. In response to the request the PSP 1003 generates signed data and returns 1092 it to the processor 312 which returns 1011 it to the SM 980. The SM 980 extracts 1027 the certificate from the response and requests verification 1094 from the AMD certificate authority 1054. The AMD certificate authority 1054 returns 1096 the verification response. If the certificate does not verify then the activation (request to run the secure VM in the TEE) terminates. If the certificate verifies then the SM 980 requests 1029 the Zone Orchestrator 310 to load the VM image into the target system. The Zone Orchestrator 310 send the VM image associated with Imag-ID to the target system with a Load Image request 1051. The Target System 312 loads the VM image into the TEE (not illustrated). The SM 980 issues a request attestation 1057 of the VM image Image-ID to the target system 312. The target system 312 issues request attestation to the trusted PSP 1003. The PSP 1003 generates the attestation response and returns 1059 it to the system 312. The target system returns 1099 the attestation response to the SM 980. The SM verifies 1055 the attestation response against the hash of the VM. If the verification fails, the activation terminates. If the verification succeeds the SM 980 get the authorization (also referred to as a decryption key) and issues 1091 an insert authorization to the target system 312. The target system passes the insert authorization 1097 to the PSP 1003. The PSP 1003 inserts the authorization into the TEE. The SM 980 issues 1093 a boot system to the target system 312, which succeeds because the secure computation is authorized (the decryption key was successfully inserted).

FIGS. 11 through 15 show alternative configurations of systems 100, 200, 300, 301, 500, and 800 that can be implemented. Different features shown in different figures from FIGS. 1 through 15 can be combined, changed or switched between the different examples.

Figure 11:
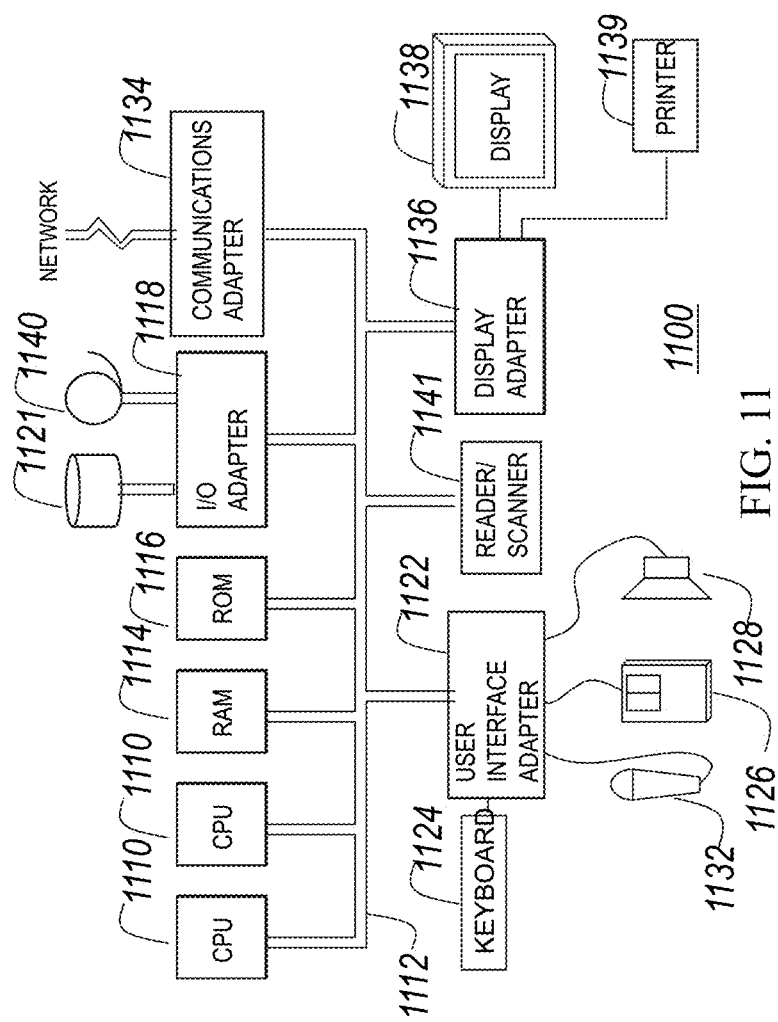
FIG. 11 illustrates an exemplary hardware/information handling system for incorporating the example embodiment of the present invention therein.
Figure 12:
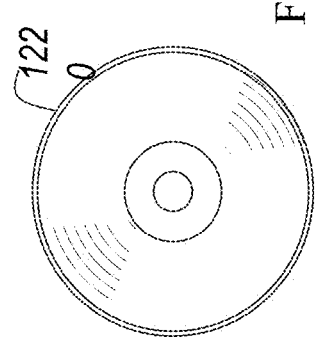
FIG. 12 illustrates a signal-bearing storage medium for storing machine-readable instructions of a program that implements the method according to the example embodiment of the present invention.
Figure 12:
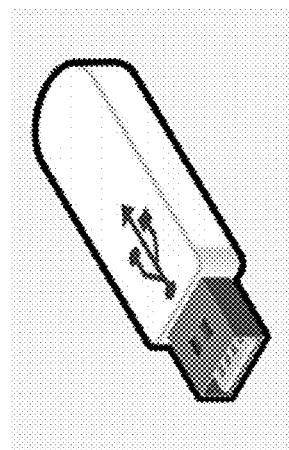

FIG. 11 illustrates another hardware configuration of the system, where there is an information handling/computer system 1100 in accordance with the present invention and which preferably has at least one processor or central processing unit (CPU) 1110 that can implement the techniques of the invention in a form of a software program for software intelligence as-a-service.

As mentioned previously, the trusted execution environment 102 can be implemented in a local infrastructure such as FIG. 11.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a flash memory 1210 or optical storage diskette 1220 (FIG. 12), directly or indirectly accessible by the CPU 1110.

Whether contained in the flash memory 1210, the optical disk 1220, the computer/CPU 1110, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
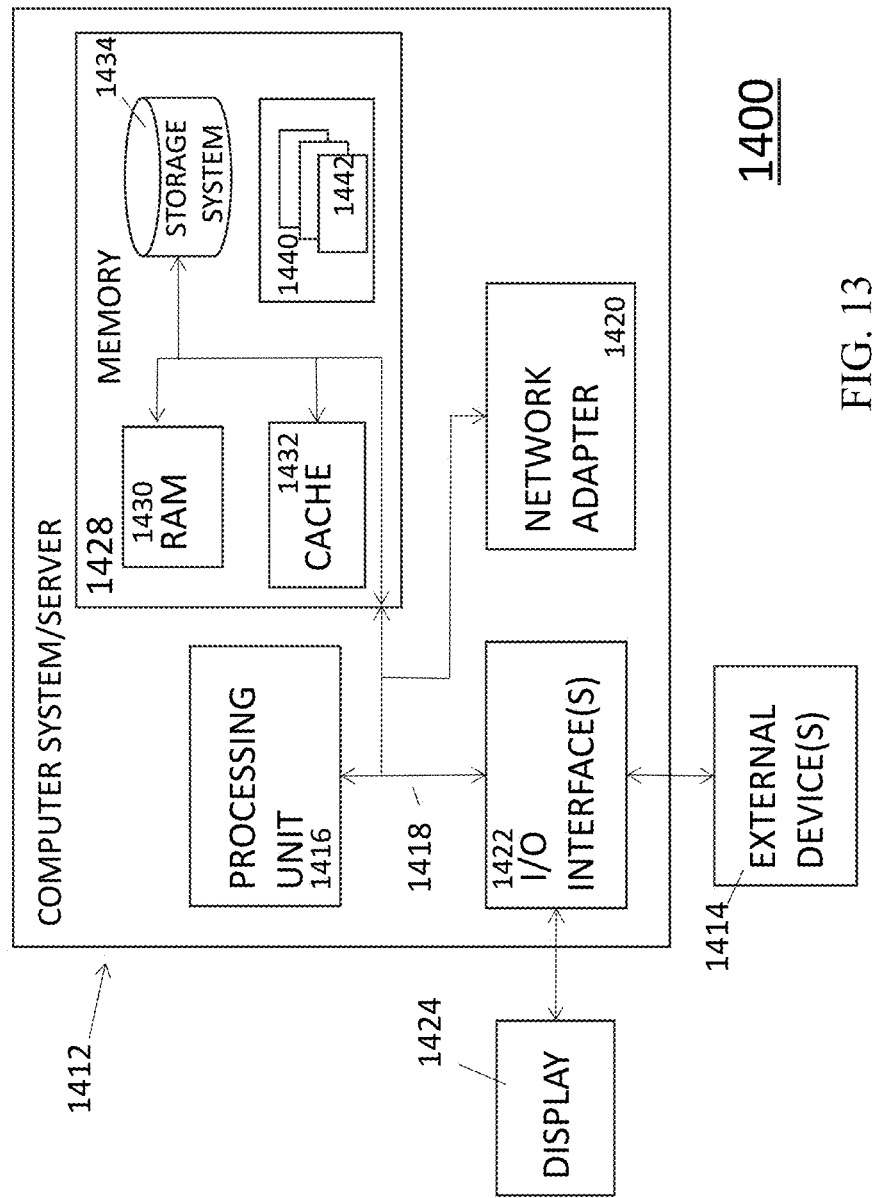
FIG. 13 depicts a cloud computing node according to an example embodiment of the present invention.

Referring now to FIG. 13, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove. As mentioned previously, The trusted execution environment 102 can be implemented in a cloud infrastructure such as FIG. 13 (and also FIGS. 14 and 15). In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 14:
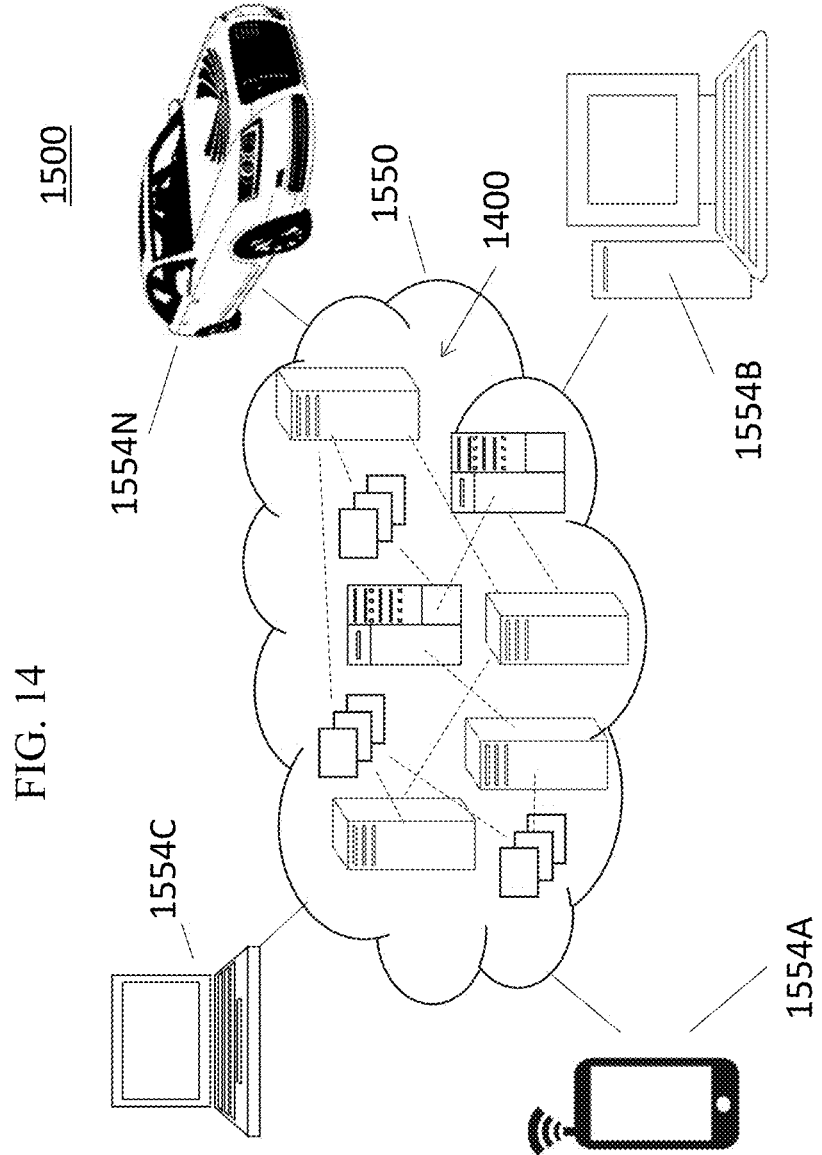
FIG. 14 depicts a cloud computing environment according to an example embodiment of the present invention.

Referring now to FIG. 14, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 16 are intended to be illustrative only and that computing nodes 1400 and cloud computing environment 1550 can communicate with any type of computerized device over any type of network and/or network addressable connection (e.g., using a web browser).

Figure 15:
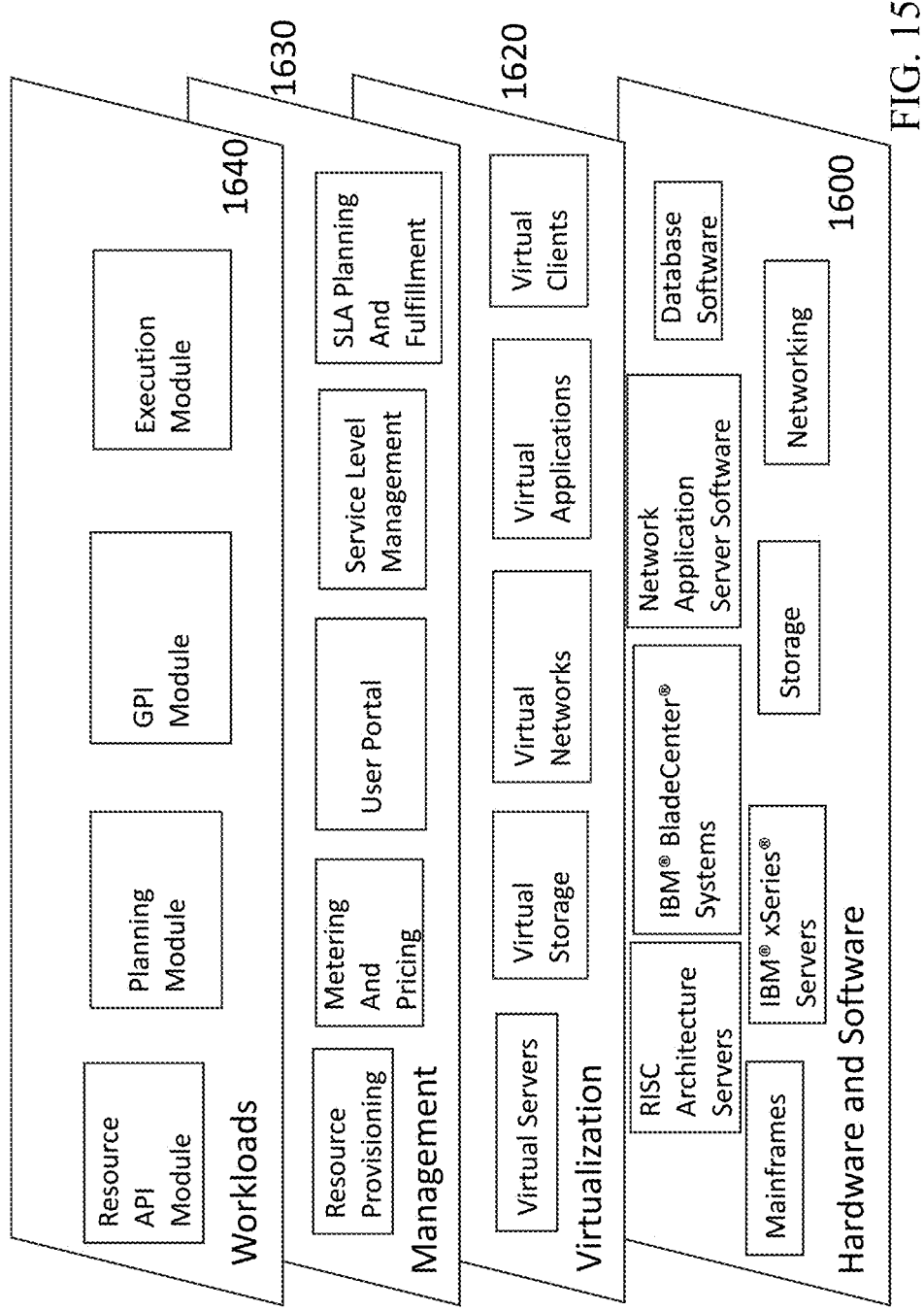
FIG. 15 depicts abstraction model layers according to an example embodiment of the present invention.

Referring now to FIG. 15, a set of functional abstraction layers provided by cloud computing environment 1550 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method for generating a computation such that it will execute in a target trusted execution environment (TEE), comprising:
   selecting the target TEE, wherein the target TEE is in a cloud or local infrastructure;
   generating, using a Security Module (SM), an authorization that is satisfied by the target TEE, wherein the SM stores a list of previously generated authorizations, wherein the SM is used as part of the cloud or local infrastructure, wherein detailed information about the target TEE is revealed only to the SM, and wherein the SM does not regenerate when an authorization has been previously generated for the target TEE;
   associating the authorization with the computation that executes in the target TEE that is authorized, wherein at least a part of the computation is encrypted and encrypting part of the computation includes encrypting information needed to check an integrity of the computation, wherein the authorization restricts the computation to a specific TEE from among a plurality of TEEs;
   generating the computation with the associated authorization executable in the target TEE; and
   provisioning the computation that is generated.

2. The method according to claim 1, further comprising: selecting attributes that are incorporated into the authorization for the target TEE that is valid.

3. The method according to claim 1, wherein associating the authorization with the computation includes inserting information into the computation dynamically.

4. The method according to claim 1, wherein a customer securely inserts a secret into the SM where the secret includes meta data that indicates which secure computation the secret is associated with.

5. The method according to claim 4, wherein the customer has control of the SM.

6. The method according to claim 1, wherein the SM inserts the authorization into the target TEE.

7. A system, comprising:
- a memory storing computer instructions; and
- a processor configured to execute the computer instructions to:
  - selecting a target trusted execution environment (TEE), wherein the target TEE is in a cloud or local infrastructure;
  - generate, using a Security Module (SM), an authorization that is satisfied by the target TEE, wherein the SM stores a list of previously generated authorizations, wherein the SM is used as part of the cloud or local infrastructure, wherein detailed information about the target TEE is revealed only to the SM, and wherein the SM does not regenerate when an authorization has been previously generated for the target TEE;
  - associate the authorization with a computation that executes in the target TEE that is authorized, wherein at least a part of the computation is encrypted and encrypting part of the computation includes encrypting information needed to check an integrity of the computation, wherein the authorization restricts the computation to a specific TEE from among a plurality of TEEs;
  - generate the computation with the associated authorization executable in the target TEE; and
  - provision the computation that is generated.

8. The system according to claim 7, further comprising:
- selecting attributes that are incorporated into the authorization for the target TEE that is valid,
- wherein associating the authorization with the computation includes inserting information into the computation dynamically,
- wherein a customer securely inserts a secret into the SM where the secret includes metadata that indicates which secure computation the secret is associated with,
- wherein the customer has control of the SM, and
- wherein the SM inserts the authorization into the target TEE.

9. A computer program product comprising a computer readable storage medium having program instructions embodied therewith, the program instructions readable and executable by a computer to cause the computer to perform a method, comprising:
- selecting a target trusted execution environment (TEE), wherein the target TEE is in a cloud or local infrastructure;
- generating, using a Security Module (SM), an authorization that is satisfied by the target TEE, wherein the SM stores a list of previously generated authorizations, wherein the SM is used as part of the cloud or local infrastructure, wherein detailed information about the target TEE is revealed only to the SM, and wherein the SM does not regenerate when an authorization has been previously generated for the target TEE;
- associating the authorization with a computation that executes in the target TEE that is authorized, wherein at least a part of the computation is encrypted and encrypting part of the computation includes encrypting information needed to check an integrity of the computation, wherein the authorization restricts the computation to a specific TEE from among a plurality of TEEs;
- generating the computation with the associated authorization executable in the target TEE; and
- provisioning the computation that is generated.

10. The computer program product according to claim 9, further comprising:
- selecting attributes that are incorporated into the authorization for the target TEE that is valid,
- wherein associating the authorization with the computation includes inserting information into the computation dynamically,
- wherein a customer securely inserts a secret into the SM where the secret includes meta data that indicates which secure computation the secret is associated with,
- wherein the customer has control of the SM, and
- wherein the SM inserts the authorization into the target TEE.

* * * * *